(12) United States Patent
De Gooijer

(10) Patent No.: US 10,234,006 B2
(45) Date of Patent: Mar. 19, 2019

(54) RECIPROCATING PISTON MECHANISM

(71) Applicant: Gomecsys B.V., Naarden (NL)

(72) Inventor: Lambertus Hendrik De Gooijer, Naarden (NL)

(73) Assignee: GOMECSYS B.V., Naarden (NL)

( * ) Notice: Subject to any disclaimer, the term of this patent is extended or adjusted under 35 U.S.C. 154(b) by 266 days.

(21) Appl. No.: 14/373,470

(22) PCT Filed: Jan. 24, 2013

(86) PCT No.: PCT/EP2013/051333
§ 371 (c)(1),
(2) Date: Jul. 21, 2014

(87) PCT Pub. No.: WO2013/110700
PCT Pub. Date: Aug. 1, 2013

(65) Prior Publication Data
US 2014/0360292 A1     Dec. 11, 2014

(30) Foreign Application Priority Data

Jan. 24, 2012   (EP) .................................... 12152309

(51) Int. Cl.
*F16H 37/12*      (2006.01)
*F16H 21/22*      (2006.01)
(Continued)

(52) U.S. Cl.
CPC .......... *F16H 37/124* (2013.01); *F02B 75/048* (2013.01); *F16H 21/22* (2013.01); *F02B 41/04* (2013.01); *Y10T 74/18208* (2015.01)

(58) Field of Classification Search
CPC ........ F02B 41/04; F02B 75/048; F02B 75/32; F16H 21/22; F16H 21/30; F16H 37/124;
(Continued)

(56) References Cited

U.S. PATENT DOCUMENTS 460,642 A * 10/1891 Kitson ................. F02B 75/048
123/78 F
1,207,429 A * 12/1916 Morison ............... F02B 75/048
123/78 F
(Continued)

FOREIGN PATENT DOCUMENTS

AU        7857681 A    6/1982
CN      102066719 A    5/2011
(Continued)

OTHER PUBLICATIONS

International Search Report and Written Opinion from the European Patent Office dated May 21, 2013 for corresponding International Application No. PCT/EP2013/051333, filed on Jan. 24, 2013.
(Continued)

*Primary Examiner* — John Zaleskas
(74) *Attorney, Agent, or Firm* — Steven M. Koehler; Westman, Champlin & Koehler, P.A.

(57) ABSTRACT

A reciprocating piston mechanism comprises a crankcase and a crankshaft. The crankshaft is supported by the crankcase and rotatable with respect thereto about a crankshaft axis. The mechanism further comprises at least a connecting rod including a big end and a small end, a piston which is rotatably connected to the small end, and a crank member which is rotatably mounted on the crankpin. The crank member comprises at least a bearing portion and has an outer circumferential wall which bears the big end of the rod such that the rod is rotatably mounted on the bearing portion of the crank member via the big end. The crank member is provided with a crank member gear. The crank member gear meshes with at least an intermediate gear, which also meshes with an auxiliary gear. The auxiliary gear is fixed to an auxiliary shaft that extends concentrically through the crankshaft.

5 Claims, 27 Drawing Sheets

(51) Int. Cl.
  *F02B 75/04*     (2006.01)
  *F02B 41/04*     (2006.01)

(58) Field of Classification Search
  CPC ............ Y10T 74/2179; Y10T 74/2181; Y10T 74/18208
  USPC ..... 123/48 B, 48 R, 78 F, 197.4; 74/44, 600, 74/602
  See application file for complete search history.

(56) References Cited

U.S. PATENT DOCUMENTS

| | | | | |
|---|---|---|---|---|
| 1,553,009 | A | | 9/1925 | Stuke |
| 1,767,352 | A | | 6/1930 | Damblanc |
| 1,964,096 | A | * | 6/1934 | Tucker ............... F16H 21/30 123/78 F |
| 2,271,766 | A | | 2/1942 | Huebotter |
| 2,369,747 | A | * | 2/1945 | Munn ................ F16H 21/30 74/44 |
| 3,686,972 | A | * | 8/1972 | McWhorter ............ F01B 9/02 123/197.4 |
| 3,861,239 | A | * | 1/1975 | McWhorter ............ F02B 41/04 123/197.4 |
| 3,886,805 | A | * | 6/1975 | Koderman ............ F16H 21/365 123/197.4 |
| 4,073,196 | A | * | 2/1978 | Dell ................. F02B 41/04 123/197.1 |
| 4,152,955 | A | * | 5/1979 | McWhorter ............ F01B 9/02 123/48 B |
| 4,179,942 | A | * | 12/1979 | Matthews ............. F02B 41/04 74/393 |
| 4,237,741 | A | | 12/1980 | Huf |
| 4,860,702 | A | | 8/1989 | Doundoulakis |
| 5,133,314 | A | * | 7/1992 | Langstroth ........... F16H 21/30 123/197.1 |
| 5,170,757 | A | | 12/1992 | Gamache |
| 5,265,566 | A | | 11/1993 | Arnold et al. |
| 5,482,015 | A | | 1/1996 | Fish |
| 5,605,120 | A | | 2/1997 | Hedelin |
| 5,611,301 | A | | 3/1997 | Bergsten |
| 5,908,014 | A | * | 6/1999 | Leithinger ........... F02B 75/048 123/48 B |
| 5,927,236 | A | * | 7/1999 | Gonzalez ............. F02B 75/048 123/197.4 |
| 6,273,052 | B1 | * | 8/2001 | Bresland ............. F01B 9/02 123/197.4 |
| 6,349,684 | B1 | * | 2/2002 | de Gooijer ........... F01B 9/02 123/197.4 |
| 6,453,869 | B1 | * | 9/2002 | Moore ................ F02B 75/048 123/197.4 |
| 6,857,412 | B2 | * | 2/2005 | Ozdamar ............ F02B 41/04 123/197.1 |
| 7,011,052 | B2 | * | 3/2006 | Dow ................ F02B 75/045 123/48 B |
| 7,293,542 | B2 | | 11/2007 | Ozdamar |
| 9,279,363 | B2 | | 3/2016 | Gooijer |
| 2003/0183026 | A1 | | 10/2003 | Korniyenko et al. |
| 2006/0053964 | A1 | | 3/2006 | Venettozzi |
| 2009/0133653 | A1 | | 5/2009 | Duzzie |
| 2009/0188337 | A1 | | 7/2009 | Chio |
| 2011/0036334 | A1 | * | 2/2011 | De Gooijer ........... F02B 41/04 123/568.14 |
| 2012/0180583 | A1 | | 7/2012 | De Gooijer |
| 2014/0360292 | A1 | | 12/2014 | De Gooier |

FOREIGN PATENT DOCUMENTS

| | | | | |
|---|---|---|---|---|
| DE | 164819 | C | | 8/1904 |
| DE | 181913 | C | | 3/1905 |
| DE | 164819 | C | | 11/1905 |
| DE | 329861 | C | * | 12/1920 ............ F02B 75/048 |
| DE | 488059 | C | | 12/1929 |
| DE | 2947882 | A1 | | 7/1981 |
| DE | 242077 | A | | 1/1987 |
| DE | 3634536 | A1 | | 2/1987 |
| DE | 3642681 | A1 | | 6/1988 |
| DE | 10230425 | A1 | | 1/2004 |
| DE | 10230426 | A1 | | 1/2004 |
| DE | 102011085647 | A1 | | 5/2013 |
| EP | 0184042 | A2 | | 6/1986 |
| EP | 0345366 | A1 | | 12/1989 |
| EP | 1959112 | A1 | | 8/2008 |
| EP | 2025893 | A1 | | 2/2009 |
| EP | 2620614 | A1 | | 7/2013 |
| FR | 636243 | A | * | 4/1928 ............. F02B 41/04 |
| FR | 986605 | A | | 8/1951 |
| FR | 2680402 | A1 | | 2/1993 |
| FR | 861611 | A | | 12/1999 |
| FR | 1014314 | A | | 7/2013 |
| GB | 150291 | A | | 11/1921 |
| GB | 173252 | A | | 12/1921 |
| GB | 1094649 | A | | 12/1967 |
| GB | 2258271 | A | | 2/1993 |
| JP | S49-6364 | A | | 1/1974 |
| JP | 6113276 | | | 6/1986 |
| JP | S61132726 | A | | 6/1986 |
| JP | 61187931 | | | 11/1986 |
| JP | S62-110614 | U | | 7/1987 |
| JP | 361135 | | | 3/1991 |
| JP | H04-22717 | A | | 1/1992 |
| JP | 10121981 | | | 10/1996 |
| JP | 2002286020 | | | 10/2002 |
| JP | 2007113471 | A | | 5/2007 |
| JP | 200936030 | | | 2/2009 |
| WO | 8607115 | A1 | | 12/1986 |
| WO | 9627079 | A1 | | 9/1996 |
| WO | 9745647 | A1 | | 12/1997 |
| WO | 9963247 | A1 | | 12/1999 |
| WO | 02/059503 | A1 | | 8/2002 |
| WO | 03/098005 | A1 | | 11/2003 |
| WO | 2006004612 | A2 | | 1/2006 |
| WO | 2008129025 | A1 | | 10/2008 |
| WO | 2009018863 | A1 | | 2/2009 |
| WO | 2009100759 | A1 | | 8/2009 |
| WO | 2011006537 | A1 | | 1/2011 |
| WO | 2013110700 | A1 | | 8/2013 |
| WO | 20130160501 | A1 | | 10/2013 |

OTHER PUBLICATIONS

Reasons for Rejection from the Japanese Patent Office for Japanese patent application No. 2014-552664, dated Jan. 30, 2017.
Chinese Office Action for corresponding Chinese patent application No. 201380009329.8, dated Apr. 5, 2016.
Korean Office Action, dated Jan. 1, 2019 for corresponding Korean Patent Application No. 10-2014-7023200, with English translation.

* cited by examiner

RECIPROCATING PISTON MECHANISM

CROSS-REFERENCE TO RELATED APPLICATION

This application is a Section 371 National Stage Application of International Application PCT/EP2013/051333 filed Jan. 24, 2013 and published as WO 2013/110700 A1 in English.

BACKGROUND

The discussion below is merely provided for general background information and is not intended to be used as an aid in determining the scope of the claimed subject matter.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Aspects of the present invention relate to a reciprocating piston mechanism.

A reciprocating piston mechanism is described in an earlier application PCT/EP2009/059040 of the applicant.

The present invention aims to provide a further improved reciprocating piston mechanism.

A reciprocating piston mechanism includes a crankcase and a crankshaft having at least a crankpin. The crankshaft is supported by the crankcase and rotatable with respect thereto about a crankshaft axis. At least a connecting rod includes a big end and a small end. A piston is rotatably connected to the small end. A crank member is rotatably mounted on the crankpin. At least a bearing portion has an outer circumferential wall which bears the big end of the connecting rod such that the connecting rod is rotatably mounted on the bearing portion of the crank member via the big end. The crank member is provided with a crank member gear, which being an external gear that meshes with at least an intermediate gear, being an external gear. The intermediate gear also meshes with an auxiliary gear, which is an external gear. The auxiliary gear is fixed to an auxiliary shaft that extends concentrically through the crankshaft. The crankshaft and the auxiliary shaft are rotatable with respect to each other.

The advantage of this mechanism is that the number of gears is minimized. The applicant has discovered that an engine comprising the reciprocating piston mechanism according to this aspect of the invention has lower friction losses than a conventional engine without the crank member and gear transmissions.

In a practical embodiment the bearing portion is eccentrically disposed with respect to the crankpin. This provides the opportunity to influence the bottom and top dead center of the piston. Particularly, in case the mechanism is applied in an internal combustion engine it is advantageous to be able to adjust the compression ratio in terms of efficiency.

The gear ratio between the crank member gear and the auxiliary gear may be two. In this case the crank member rotates in the same direction as the crankshaft and at half speed thereof if the auxiliary gear has a fixed angular position with respect to the crankcase. When the bearing portion is eccentrically disposed with respect to the crankpin, this provides the opportunity to change the compression ratio upon adjusting the angular position of the auxiliary gear.

The mechanism may be provided with a drive mechanism for turning the auxiliary gear with respect to the crankcase about the crankshaft axis.

The drive mechanism may comprise a stop block, which is configured to fix the auxiliary shaft at different angular positions with respect to the crankcase.

More specifically, the stop block may comprise a control ring which is fixed to the auxiliary shaft and is provided with a plurality of recesses, and an actuator including a controlled displaceable pin that fits in each of the respective recesses. Preferably, the drive mechanism is provided with a spring that is fixed to the auxiliary shaft and the crankcase. If the mechanism is applied in an internal combustion engine the actual combustion forces caused by the combustion stroke may force the auxiliary shaft to turn in an angular direction against the spring force, when the pin is retracted from the corresponding recess. At a desired angular position of the auxiliary shaft the pin can be moved back to the control ring such that the pin fits in another recess. The control ring may be rotated in an opposite direction by selecting an engine load at which the spring force is higher than the actual rotational force of the auxiliary shaft on the spring.

It is also possible that the drive mechanism is provided with a spring that is fixed to the auxiliary shaft and the crankcase without a locking member for fixing the angular position of the auxiliary shaft. In such a case the angular position of the auxiliary shaft is automatically balanced on the basis of the actual force of the auxiliary shaft onto the spring and the actual spring force onto the auxiliary shaft.

The stop block may comprise a control ring which is fixed to the auxiliary shaft in rotational direction thereof, and an electromagnet may be present for fixing the control ring to the crank case, wherein the mechanism is preferably provided with a spring that is fixed to the auxiliary shaft and the crankcase. The advantage of this embodiment is that the auxiliary shaft can be locked with respect to the crank case at various angular positions continuously. In case of applying the mechanism including the spring in an internal combustion engine this may function in the following manner. If a different compression ratio is desired the electromagnet is switched-off such that the auxiliary shaft is rotatable with respect to the crankcase. If the engine is operated at a higher engine load, in which a lower compression ratio is desired, the actual relatively high rotational force of the auxiliary shaft on the spring exceeds its spring force, causing the auxiliary shaft including the control ring to turn in the direction of the resultant force. When switching-on the electromagnet the control ring including the auxiliary shaft is locked to the crankcase. If the engine is operated at a lower engine load, in which a higher compression ratio is desired, the electromagnet is switched-off and the control ring will be turned in the opposite direction since the actual rotational force of the auxiliary shaft on the spring at the corresponding relatively low engine load is smaller than the spring force. The control ring can then be locked in its new position by means of switching-on the electromagnet.

Alternatively, the drive mechanism may comprise a drivable worm meshing with a worm gear which is fixed to the auxiliary shaft. This provides the opportunity to vary the angular position of the auxiliary gear in a continuous manner. Furthermore, this embodiment of the mechanism may be provided with a pressure sensor at the worm which is an indication of the combustion pressure. It is noted that, the worm in combination with a pressure sensor is not necessarily related to a mechanism as described hereinbefore; it may also be applied in other reciprocating piston mechanisms in which, for example, the angular position of a central gear is driven by a worm to configure the compression ratio, for example in the mechanism as described in PCT/EP2009/059040.

Another aspect of the present invention is a reciprocating piston mechanism includes a crankcase and a crankshaft having at least a crankpin. The crankshaft is supported by the crankcase and rotatable with respect thereto about a crankshaft axis. At least a connecting rod includes a big end and a small end. A piston is rotatably connected to the small end. A crank member is rotatably mounted on the crankpin. At least a bearing portion has an outer circumferential wall which bears the big end of the connecting rod such that the connecting rod is rotatably mounted on the bearing portion of the crank member via the big end. Thee crank member is driveably coupled to an auxiliary wheel which is fixed to an auxiliary shaft that extends concentrically through the crankshaft. The crankshaft and the auxiliary shaft are rotatable with respect to each other. The auxiliary wheel is disposed at the same side of an adjacent crank arm as the crank member. The mechanism is configured such that under operating conditions the crank member rotates in the same direction as the crankshaft and at half speed thereof, whereas the auxiliary shaft has a substantially fixed angular position with respect to the crankcase.

The mechanism provides the opportunity to vary the top dead center of the piston by means of adjusting the angular position of the auxiliary shaft with respect to the crankcase. In practice the crank member and the auxiliary wheel are driveably coupled to each other by a transmission, formed by gears, chains, belts or the like. It is noted that the speed of rotation of the crank member and the crankshaft is defined in respect to the crankcase.

In a preferred embodiment the crank member gear meshes with at least a further intermediate gear which also meshes with the auxiliary gear, since this distributes forces within the mechanism.

The internal diameter of the crank member can be enlarged at an end portion thereof. This means that the internal diameter at the end portion is larger than at its central cylindrical portion where it contacts a cylindrical portion of the crankpin during rotation of the crankshaft. This provides the opportunity to enlarge the diameter of the crankshaft adjacent to a cylindrical portion of the crankpin. In such a case the crank member gear may partly protrude beyond the cylindrical portion of the crankpin in longitudinal direction thereof. This is advantageous in terms of rigidity of the crankshaft and building in a compact manner as seen along the crankshaft axis.

The protruding end portion of the crank member is also advantageous if the crankpin is mounted to an adjacent crank arm by means of a press fit, because it provides the opportunity to create a relatively long press fit connection between the crankpin and the crank arm as seen in axial direction of the crankpin. The length of the press fit in axial direction of the crankpin may be larger than 30% of the diameter of the crankpin, and is preferably larger than 40% thereof.

The crank member may comprise a second crank member gear for driving at least a further crank member including a further crank member gear, which further crank member is rotatable mounted to a further crankpin, wherein the crank member gear and the second crank member gear are located at opposite end portions of the crank member, wherein the second crank member gear meshes with a further auxiliary gear which is fixed to a shaft that extends through an adjacent crank arm and on which shaft another auxiliary gear is fixed which meshes with the further crank member gear, wherein the diameter of the crankpin at the crank member gear is smaller than the diameter of the further crankpin at the further crank member gear. This provides the opportunity to apply a crank member gear that has a relatively small diameter. In a practical embodiment, the diameter of the crankpin is smaller than the diameter of the further crankpin. As a consequence, the big end of the cooperating connecting rod may also be smaller than that of the connecting rod which cooperates with the further crankpin.

Alternatively or additionally, the diameter of the crank member gear may be smaller than the diameter of the second crank member gear and/or the width of the crank member gear may be smaller than the width of the second crank member gear.

BRIEF DESCRIPTION OF THE DRAWINGS

Aspects of the invention will hereafter be elucidated with reference to the schematic drawings showing embodiments of the invention by way of example.

DETAILED DESCRIPTION OF THE ILLUSTRATIVE EMBODIMENTS

Figure 1:
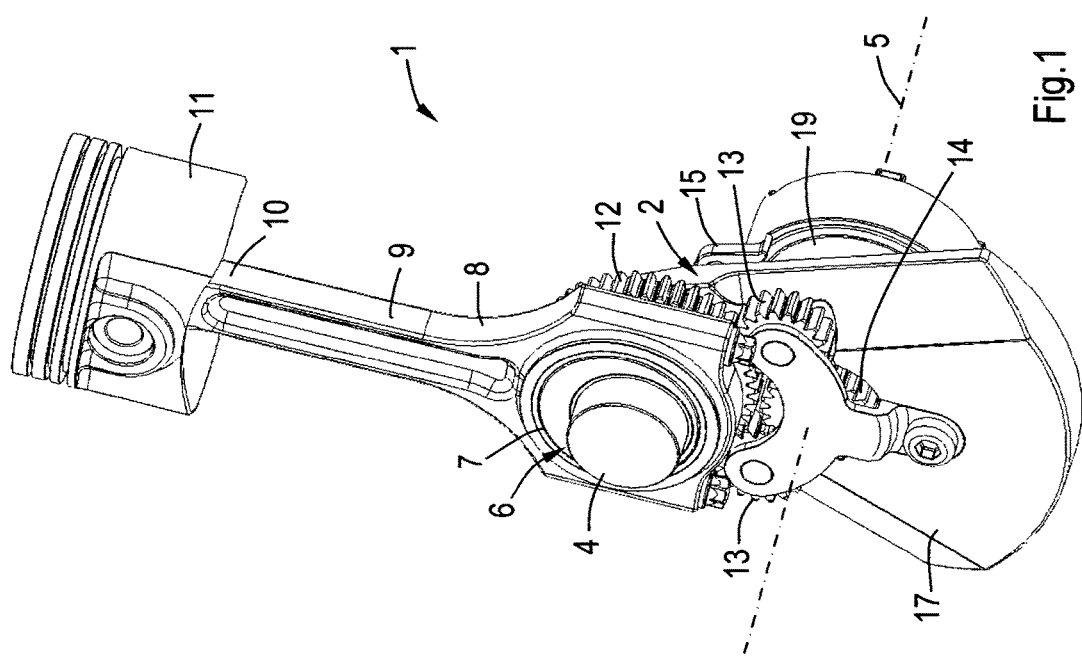
FIG. 1 is a perspective view of an embodiment of a reciprocating piston mechanism.

FIG. 1 shows a part of an embodiment of a reciprocating piston mechanism 1, which is suitable for an internal combustion engine. The reciprocating piston mechanism 1 comprises a crankcase 15, which supports a crankshaft 2 by crankshaft bearings 3, see FIGS. 4 and 5. The crankshaft 2 includes a crankpin 4 and is rotatable with respect to the crankcase 15 about a crankshaft axis 5.

The reciprocating piston mechanism 1 comprises a crank member 6 which is rotatably mounted on the crankpin 4. The crank member 6 is provided with a bearing portion 7 which is disposed eccentrically with respect to the crankpin 4, see FIG. 2. The bearing portion 7 has an outer circumferential wall which bears a big end 8 of a connecting rod 9. Thus, the connecting rod 9 is rotatably mounted on the crank member 6 via its big end 8. The connecting rod 9 also includes a small end 10 to which a piston 11 is rotatably connected.

Figure 2:
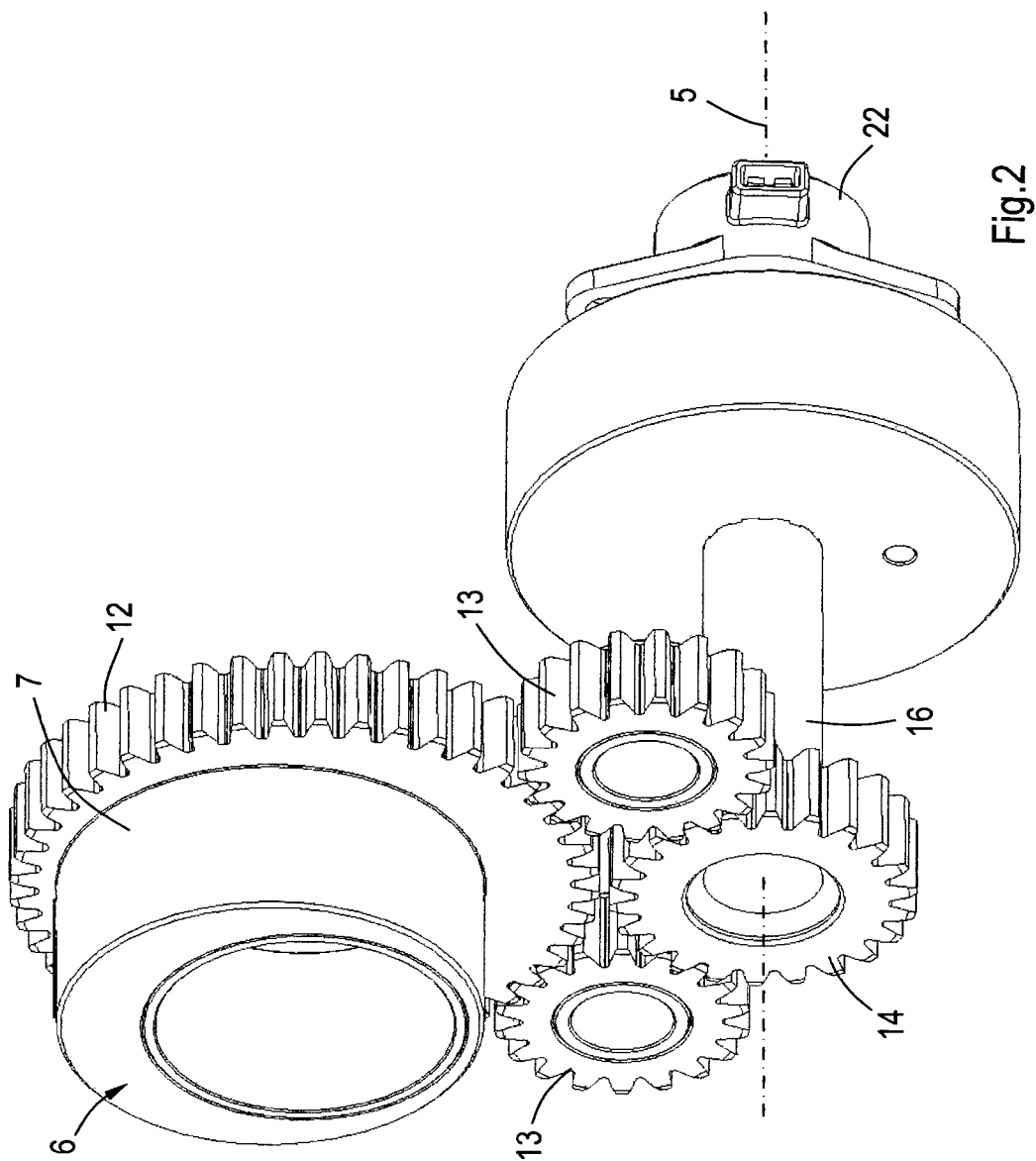
FIGS. 2 and 3 are perspective views of a part of the embodiment of FIG. 1 on a larger scale and seen from different sides.
Figure 3:
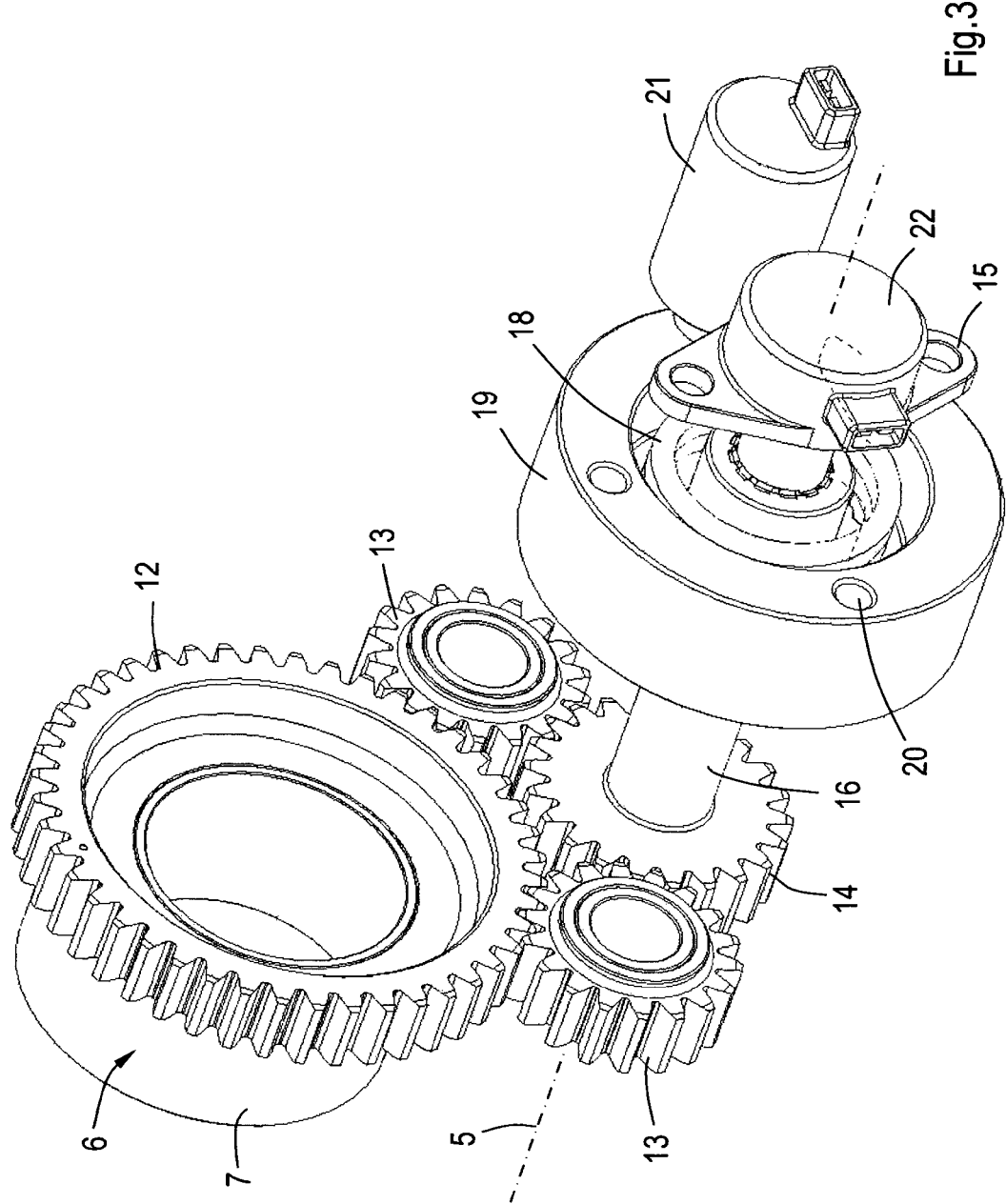
Figure 4:
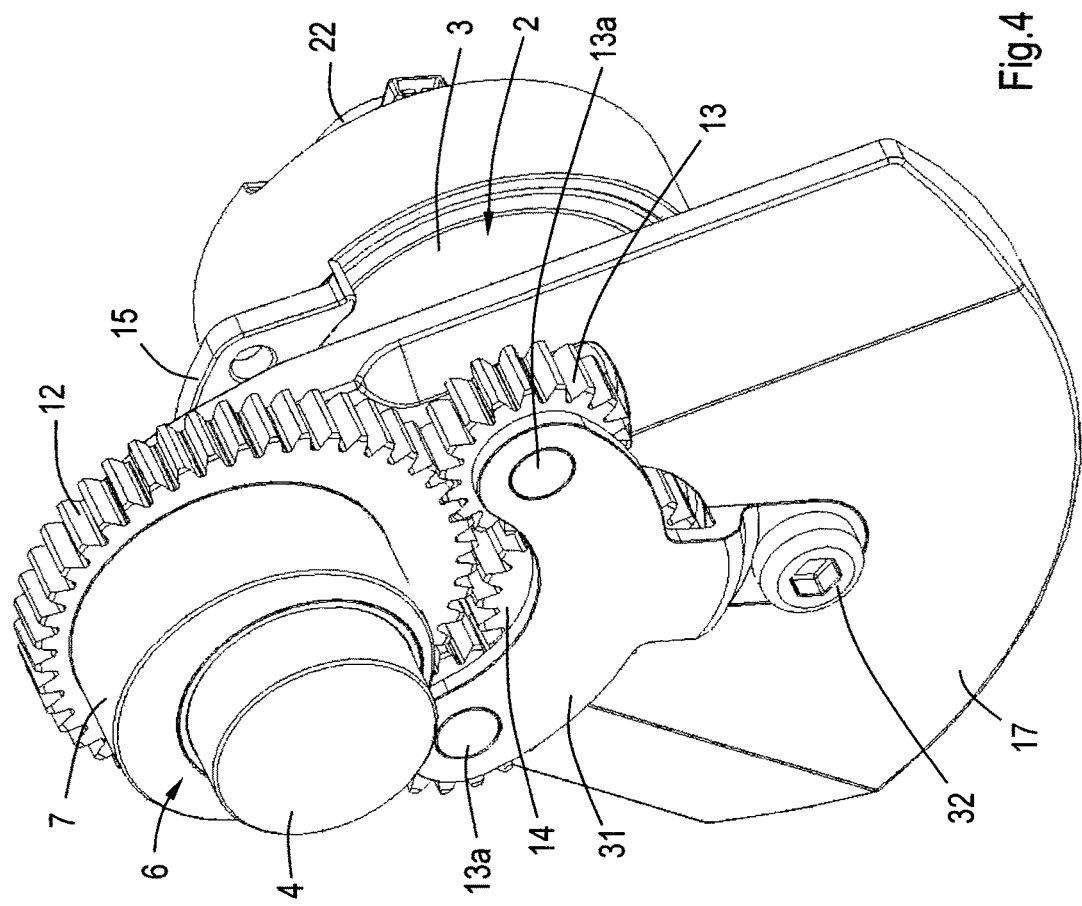
FIGS. 4 and 5 are similar to FIGS. 2 and 3, but illustrating the part including the crankshaft.
Figure 5:
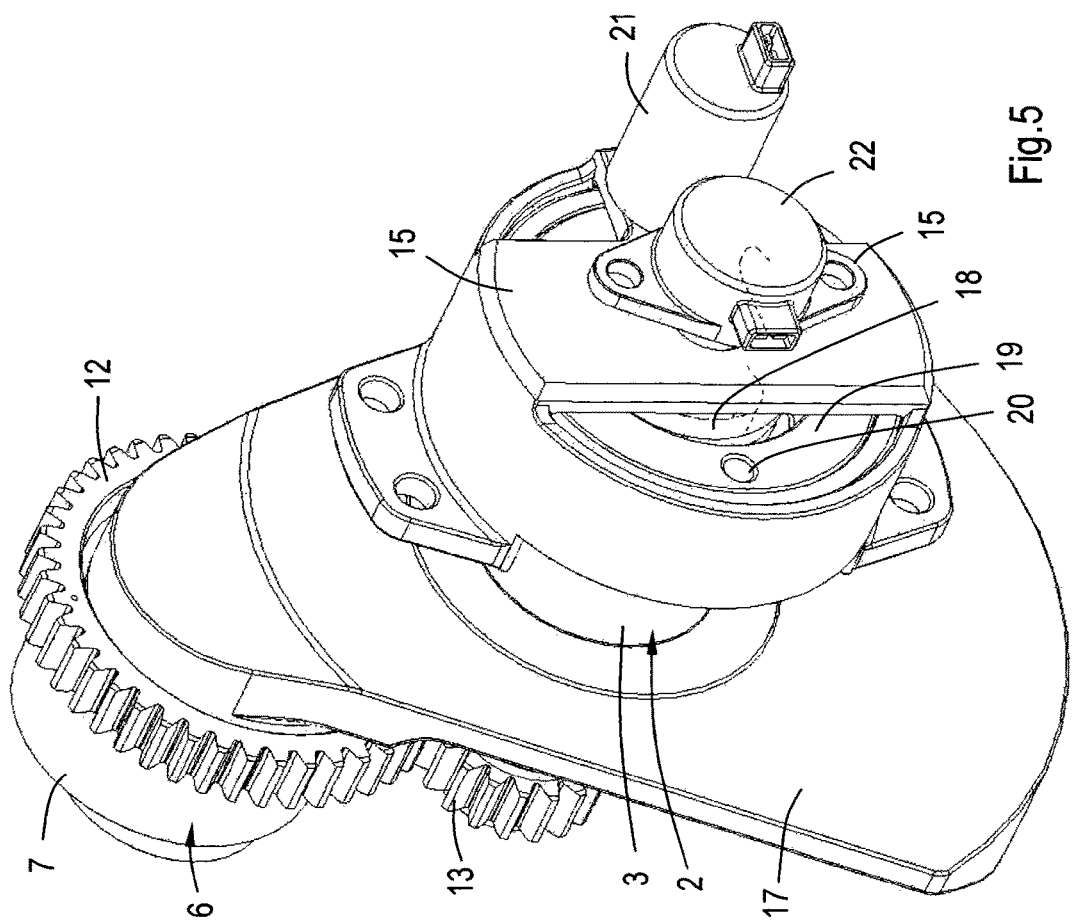

FIGS. 2 and 3 show a part of the embodiment of FIG. 1 as seen from different sides. The crankshaft 2 and connecting rod 9 are not shown for clarity reasons. FIGS. 4 and 5 show the same part, but including the crankshaft 2.

The crank member 6 is provided with a crank member gear 12 which meshes with two intermediate gears 13. The crank member 6 and the crank member gear 12 may be made of one piece, but the crank member gear 12 may be pressed onto a cylindrical base part of the crank member 6, as well. The intermediate gears 13 are rotatably mounted to the crankshaft 2 and their axes of rotation extend parallel to the crankshaft axis 5. Each of the intermediate gears 13 also meshes with an auxiliary gear 14. The auxiliary gear 14 is fixed to an auxiliary shaft 16. The auxiliary shaft 16 extends concentrically through the crankshaft 2 and is rotatable with respect to the crankshaft 2 about the crankshaft axis 5. Thus, the auxiliary shaft 16 is rotatable about an auxiliary shaft axis which substantially coincides with the crankshaft axis 5. As a consequence, the center line of the auxiliary gear 14 coincides with the crankshaft axis 5.

FIGS. 1, 4 and 5 show that the auxiliary gear 14, the intermediate gears 13 and the crank member gear 12 are mounted at the same side of a crank arm 17 of the crankshaft 2. This can also be seen in the side view of FIG. 9. The crank arm 17 and the adjacent crankshaft bearing 3 are integrated such that the auxiliary shaft 16 extends through both. Thus, the auxiliary shaft 16 extends within an outer circumference of the crankshaft bearing 3. It can be seen in FIG. 1 that the intermediate gears 13 are disposed at a side of the crankshaft 2 where a counterweight is located which creates a compact structure.

In the embodiment as shown in FIGS. 1-5 the crank member gear 12, the intermediate gears 13 and the auxiliary gears 14 may be external gears. Due to this configuration the reciprocating piston mechanism 1 can be built in a compact way and is simpler than those known in the art.

The gear dimensions can be selected such that under operating conditions the crank member 6 rotates in the same direction as the crankshaft 2 and at half speed thereof. The direction of rotation is defined with respect to the crankcase. The directions and speeds of rotation are achieved when the gear ratio between the crank member gear 12 and the auxiliary gear 14 is two and the auxiliary shaft 16 is held at a constant angular position with respect to the crankcase 15. In order to achieve the desired gear ratio it is relevant that the intermediate gears 13 and the auxiliary gear 14 are located at the same side of the crank arm 17 since in practice the diameter of the auxiliary gear 14 is relatively small, which would lead to a small diameter of the crankshaft 2 at the location of the auxiliary gear 14 if this was mounted rotatably on the crankshaft 2 at the opposite side of the crank arm 17.

It is noted that a function of the intermediate gears 13 is to turn the auxiliary gear 14 in the correct direction of rotation in case of applying a gear transmission between the crank member 6 and the auxiliary shaft 16. The number of teeth of the intermediate gears 13 is not relevant for the transmission ratio between the crank member gear 12 and the auxiliary gear 14.

Figure 17:
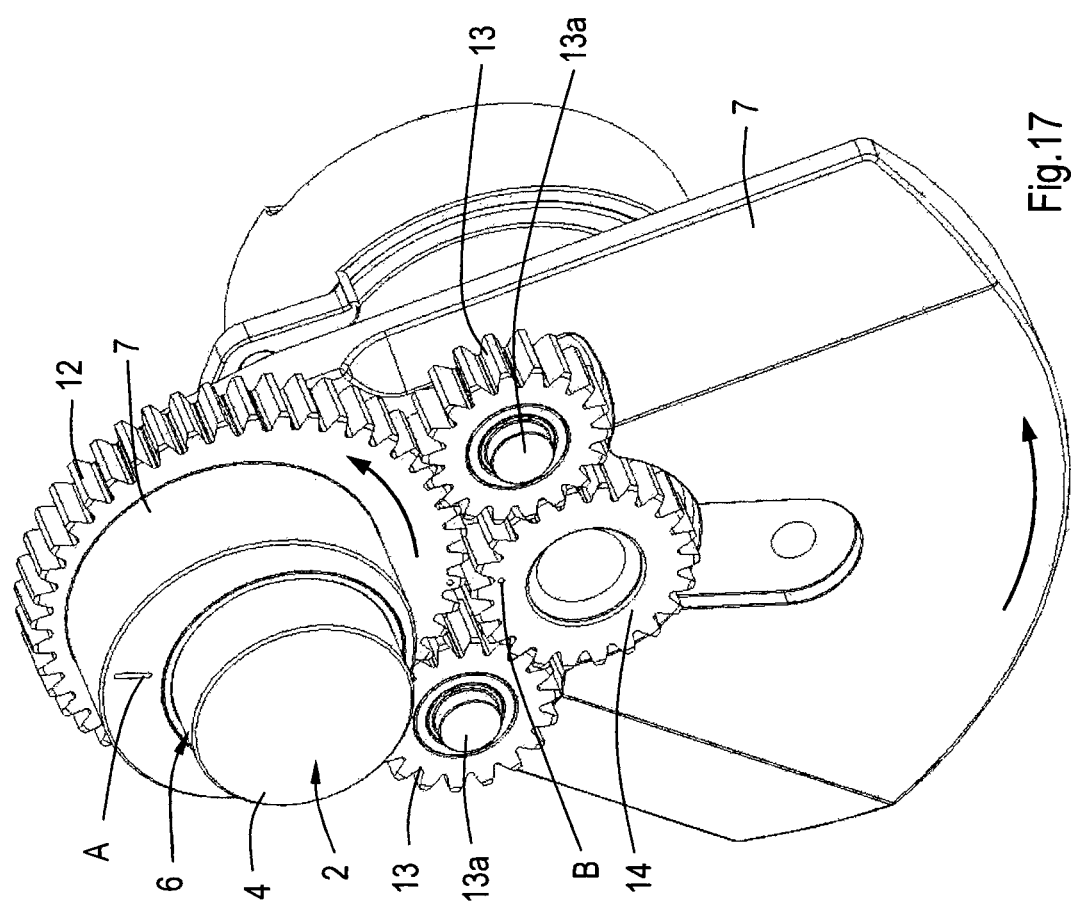
FIGS. 17-20 are similar views as FIG. 4 in which a bracket is eliminated to illustrate positions of different parts under operating conditions.
Figure 18:
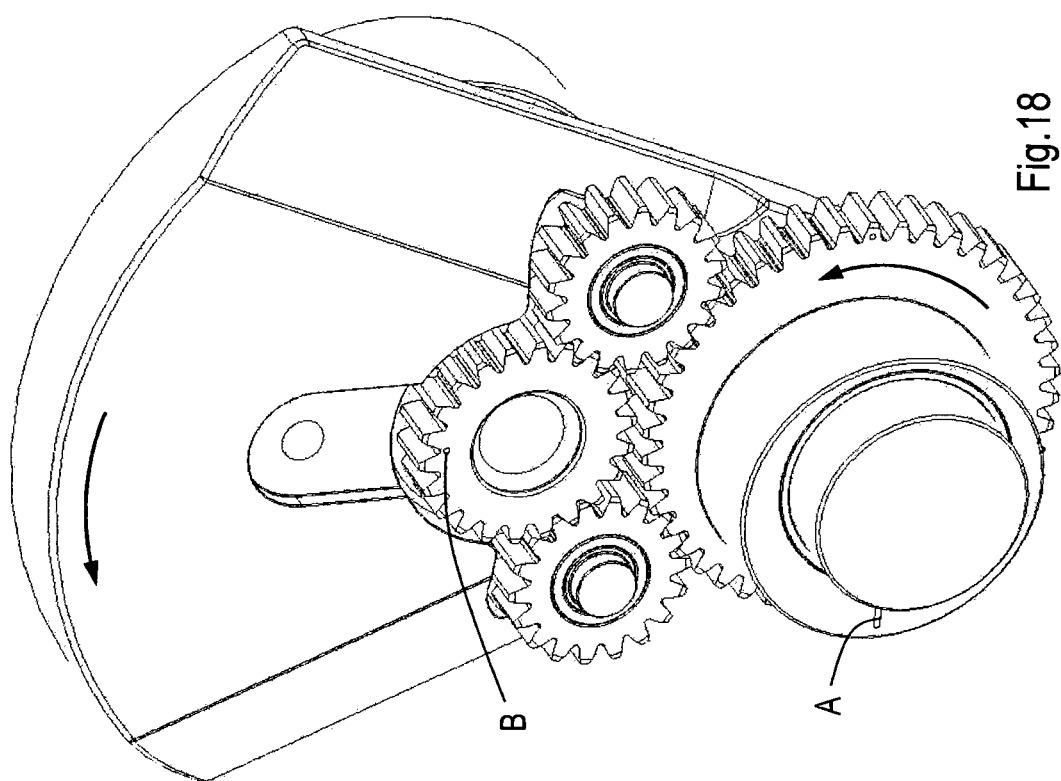
Figure 19:
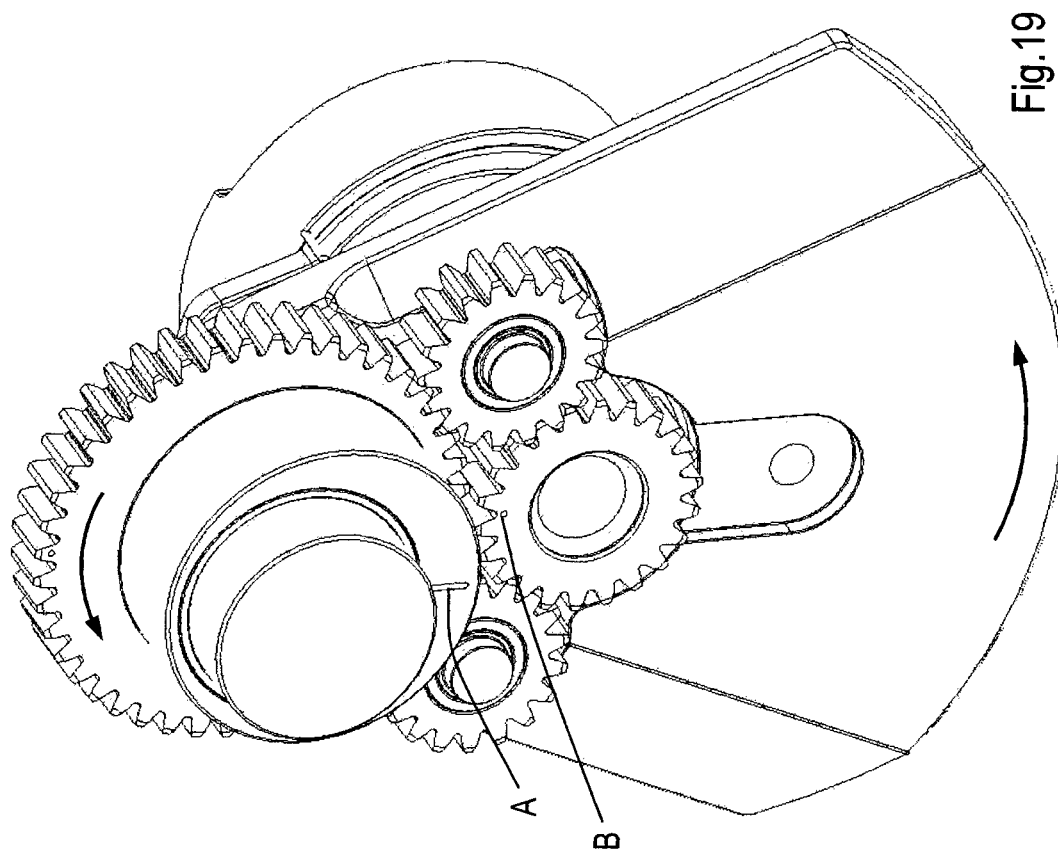
Figure 20:
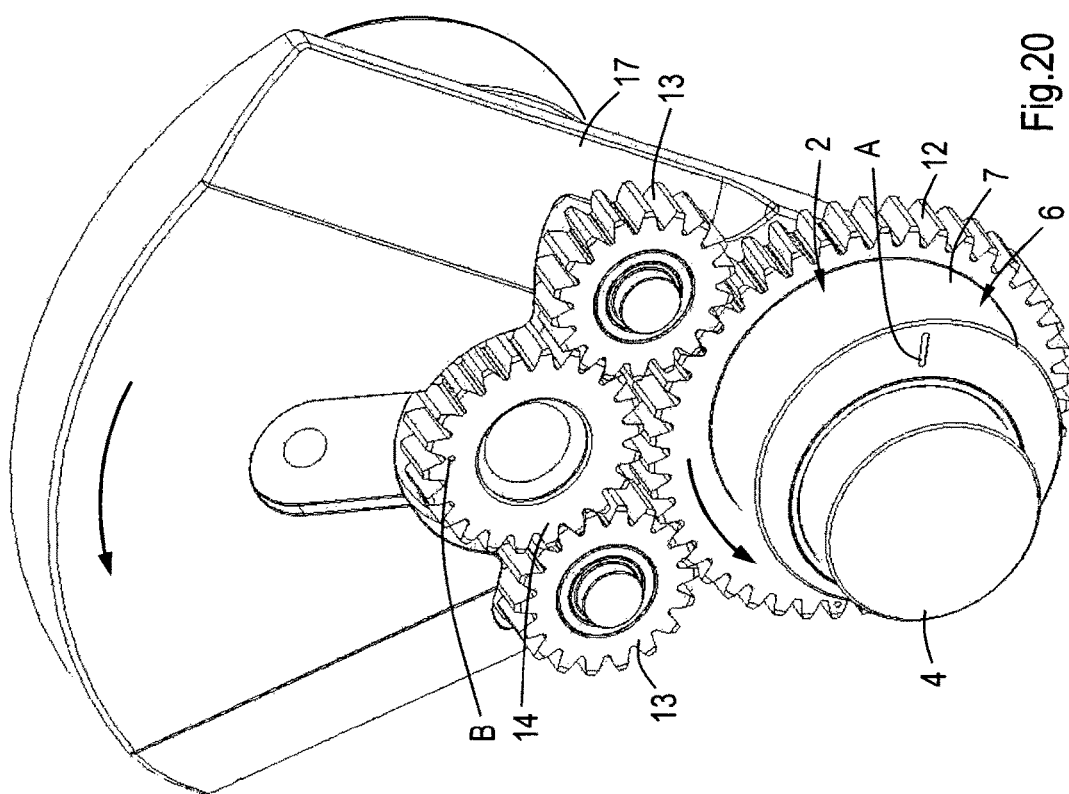

In order to illustrate the functioning of the mechanism under operating conditions FIGS. 17-20 show four different positions of the crankshaft 2 with respect to the crankcase 15. For illustrative reasons the crank member 6 and the auxiliary gear 14 are provided with marks A, B, see FIG. 17. The direction of rotation of the crankshaft 2 and the crank member 6 with respect to the crankcase 15 are shown by respective arrows. FIG. 17 shows the position of top dead center. In the position as shown in FIG. 18 the crankshaft 2 has rotated anti clockwise by 180° with respect to the crankcase. It can be seen that the auxiliary gear 14 has maintained its angular position whereas the crank member gear 12 has also rotated anti clockwise with respect to the crankcase 15, but by an angle of 90°. FIGS. 19 and 20 show further steps of rotation of the crankshaft 2 by steps of 180°. FIGS. 17-20 show that two full rotations of the crankshaft 2 corresponds to one full rotation of the crank member 6, as defined with respect to the crankcase 2.

The reciprocating piston mechanism 1 as shown in FIGS. 1-5 provides the opportunity to adjust the top dead center of the piston 11, hence its compression ratio, by changing the angular position of the auxiliary shaft 16 with respect to the crankcase 15. In FIGS. 1-5 and more specifically in FIG. 3 it can be seen that the mechanism 1 is provided with a torsion spring 18 which is fixed to the auxiliary shaft 16, on the one hand, and to the crankcase 15, on the other hand. A control ring 19 is attached to the auxiliary shaft 16, for example by means of pressing, and provided with recesses 20 which are located at mutual angular distances about the crankshaft axis 5. The mechanism 1 also comprises an actuator 21 which controls a pin (not shown) that fits in each of the recesses 20. Under stable running conditions the pin holds the control ring 19 at a fixed position with respect to the crankcase 15 and the mechanism 1 runs at a fixed compression ratio.

It is conceivable to eliminate the actuator 21 including the pin, which means that the auxiliary shaft 16 is not lockable to the crankcase 15. In that case, under operating conditions the auxiliary shaft 16 may vibrate in rotational direction due to the presence of the torsion spring 18, which vibration is initiated by varying combustion forces in case of an internal combustion. The average angular position of the auxiliary shaft 16 is then determined by a natural balance between the actual load of the auxiliary shaft 16 on the torsion spring 18 and the actual spring force of the torsion spring 18 on the auxiliary shaft 16. At a higher load due to increased combustion forces, the action and reaction force between the auxiliary shaft 16 and the torsion spring 18, i.e. the natural balance, lies at a higher level. This means that the torsion spring 18 will be compressed and the auxiliary shaft 16 is turned by a certain angle with respect to the crankcase 15. At a lower load the opposite effect is achieved. As a consequence, an automatic adjustment of the angular position of the auxiliary shaft 16 is attained.

In case of applying the mechanism 1 in an internal combustion engine the embodiment as shown in FIG. 3 works as follows. If a different compression ratio is desired the pin is retracted out of the corresponding recess 20 by the actuator 21 at a predetermined engine load. For example, if a lower compression ratio is desired, i.e. switching to a higher engine load, the actual relatively high rotational force of the auxiliary shaft 16 on the torsion spring 18 exceeds the spring force of the torsion spring 18, causing the auxiliary shaft 16 including the control ring 19 to turn in the direction of the resultant force. If the pin is displaced back towards the control ring 19 the pin fits into another recess 20. If the control ring 19 should be turned in the opposite direction in order to obtain a higher compression ratio, i.e. switching to a lower engine load, the actual rotational force of the auxiliary shaft 16 on the spring 18 at the corresponding relatively low engine load is smaller than the spring force of the torsion spring 18, hence turning the control ring 19 to the opposite direction. The control ring 19 can then be fixed with respect to the crankcase 15 by means of inserting the pin into the corresponding recess 20.

It is noted that the actuator 21 may be controlled electrically, hydraulically or the like. Furthermore, the circumferential surface of the control ring 19 may be part of a bearing in order to support the control ring 19 by the crankcase 15. The crankcase 15 may bear the control ring 19 by means of a ball bearing 19*a*, see FIG. 10, but alternative bearings are conceivable.

The angular position of the auxiliary shaft 16 is monitored by a sensor 22, which may be a simple potentiometer. The sensor is mounted to the crankcase 15. The signal from the sensor 22 is an indication of the actual compression ratio.

Figure 22:
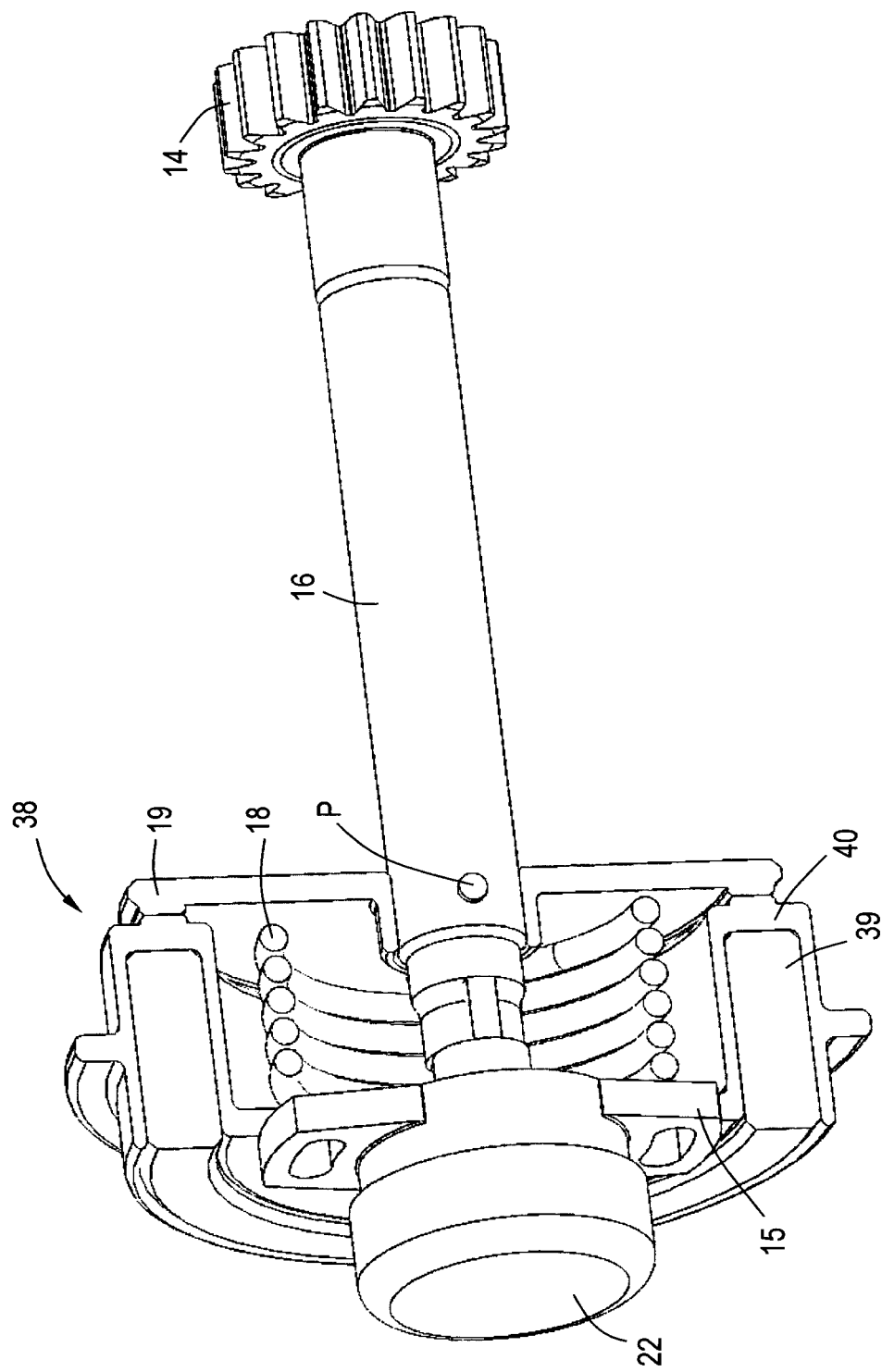
FIG. 22 is a perspective view of an alternative embodiment of an actuator.

FIG. 22 shows an alternative embodiment of an actuator 38 for locking the control ring 19 at a fixed position with respect to the crankcase 15 such that the mechanism 1 runs at a fixed compression ratio. In this embodiment the control ring 19 is fixed to the auxiliary shaft 16 in rotational direction thereof. The torsion spring 18 is fixed to the auxiliary shaft 16 at location P as indicated in FIG. 22 and to the crankcase 15 close to the sensor 22. The actuator 38 comprises an electromagnet 39 which is attached to the crankcase 15 and covered by a magnet cover 40. Upon turning-on the electrical current through the electromagnet 39 the control ring 19 is pulled against the magnet cover 40 such that the control ring 19 including the auxiliary shaft 16 is hold at a fixed position with respect to the crankcase 15. The cooperating contact surfaces of the magnet cover 40 and the control ring 19 may be provided with friction matter. The axial distance between the cooperating contact surfaces in case the electromagnet is not activated is very small, for example smaller than 0.2 mm such that the axial displacement of the control ring 19 with respect to the auxiliary shaft 16, or of the control ring 19 including the auxiliary shaft 16 with respect to the crankcase 15 is very small. It is noted that switching between high and low-load and high and low compression ratios by means of the torsion spring 18 can be performed in a similar way as explained hereinbefore in relation to the embodiment according to FIGS. 1-5.

Figure 6:
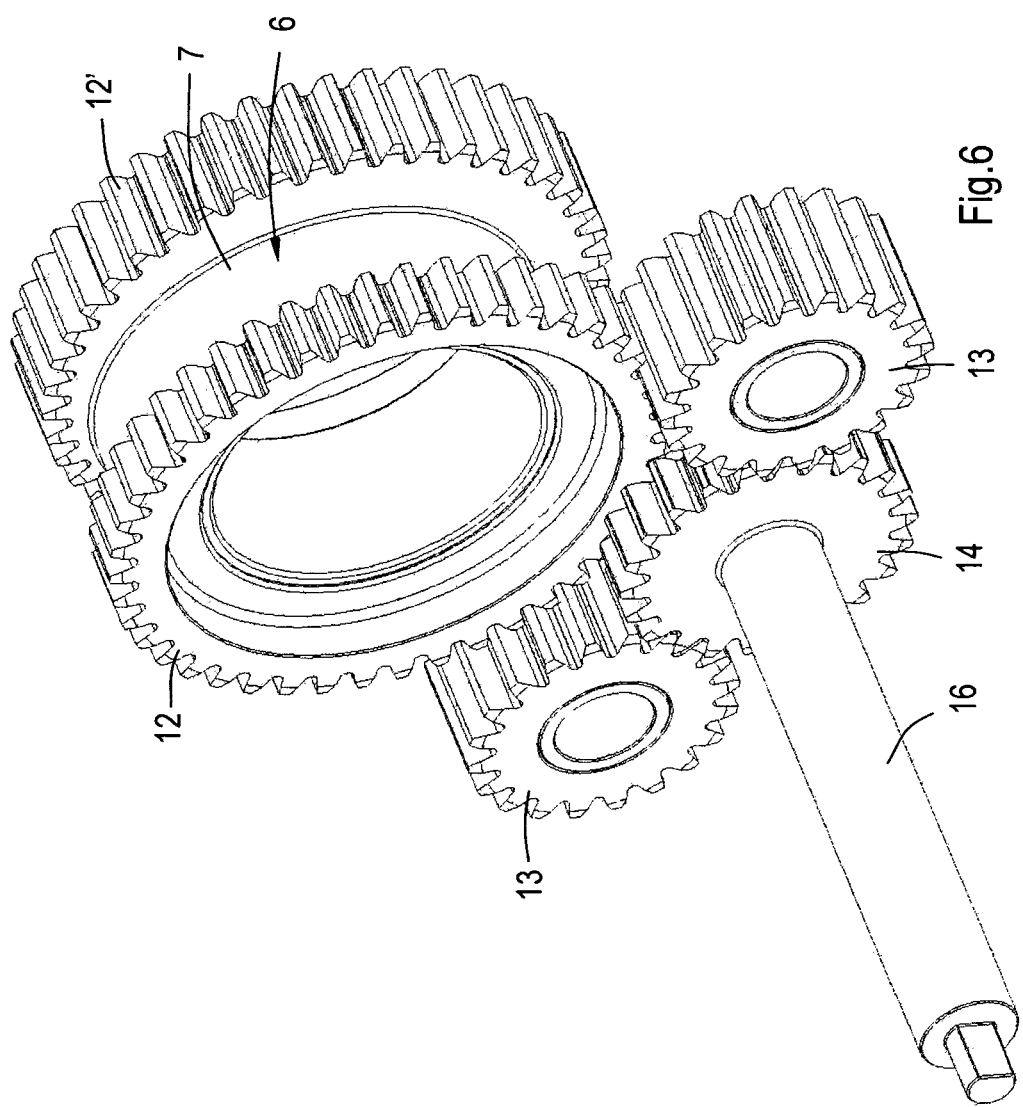
FIG. 6 is a perspective view of a part of an alternative embodiment of the part as shown in FIGS. 2 and 3.

In the embodiment as shown in FIGS. 1-5 the crank member gear 12 and the auxiliary gear 14 are located next to each other within the same plane. Most piston mechanisms have piston strokes, which may not allow the configuration as shown in FIGS. 1-5. In such a case the intermediate gears 13 may be lengthened such that they extend beyond the crank member gear 12 in at least one direction thereof, whereas the auxiliary gear 14 meshes with the intermediate gears 13 at the extended portions thereof such that the auxiliary gear 14 partly overlaps the crank member gear 12. This is shown in FIG. 6 where the auxiliary gear 14 is located in front of the crank member gear 12. In this embodiment the sum of the outer diameters of the crank member gear 12 and the auxiliary gear 14 is larger than a piston stroke, whereas the gears 12-14 are located at the same side of the crank arm 17.

Furthermore, FIG. 6 shows that the crank member 6 comprises a second crank member gear 12' for driving further crank members in case of a multi-cylinder reciprocating piston mechanism. The crank member gear 12 and the second crank member gear 12' are located at opposite end portions of the crank member 6. The big end 8 of the connecting rod 9 is disposed between the crank member gear 12 and the second crank member gear 12'. FIGS. 13-16 show an embodiment of a multi-cylinder internal combustion engines in which the second crank member gear 12' drives crank member gears that are provided at other crank pins. The second crank member gear 12' meshes with a further auxiliary gear 34 which is fixed to a shaft 35 that extends through an adjacent crank arm 17' and/or crank arms and/or main bearings, and on which shaft 35 another auxiliary gear 36 is fixed which drives a further crank member gear 37 of an adjacent crank pin. FIGS. 6 and 13-16 show that the width of the crank member gear 12 is smaller than that of the second crank member gear 12'. This is possible since the crank member gear 12 meshes with two intermediate gears 13, whereas the second crank member gear 12' meshes with only one further auxiliary gear 34.

The diameter of the crank member gear 12 that meshes with the intermediate gears 13 may be different from the diameter of the second crank member gear 12' and the further crank member gears 37. This may be desired for packaging reasons at the crank arm 17. In such a case a relatively small crank member gear 12 may be pressed onto the cylindrical base part of the crank member 6. In respect of the second crank member gear 12' and the further crank member gears 37 and the other auxiliary gears 36 it is relevant that identical transmission ratios are applied.

Figure 7:
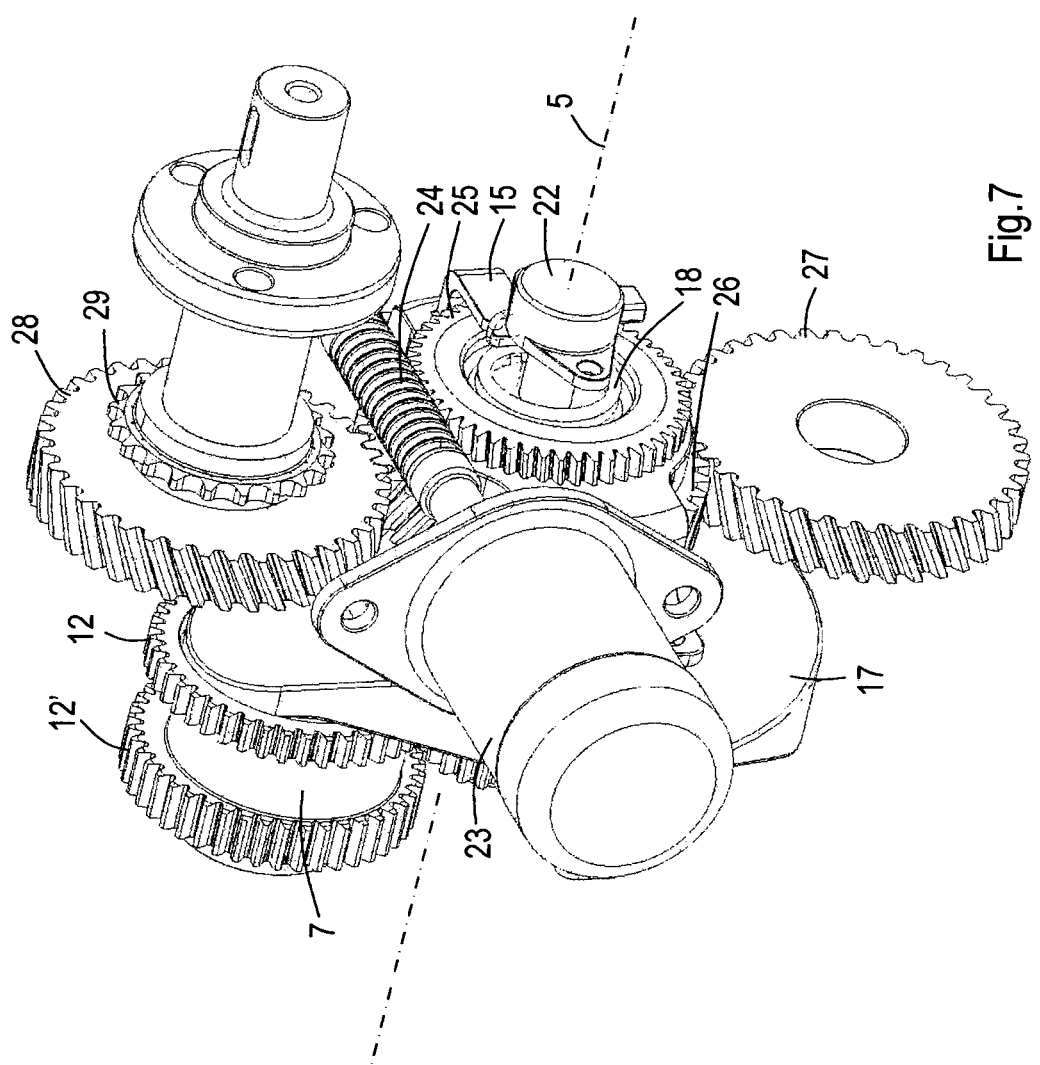
FIG. 7 is a perspective view of a part of an internal combustion engine which is provided with an embodiment of the mechanism according to the invention.
Figure 8:
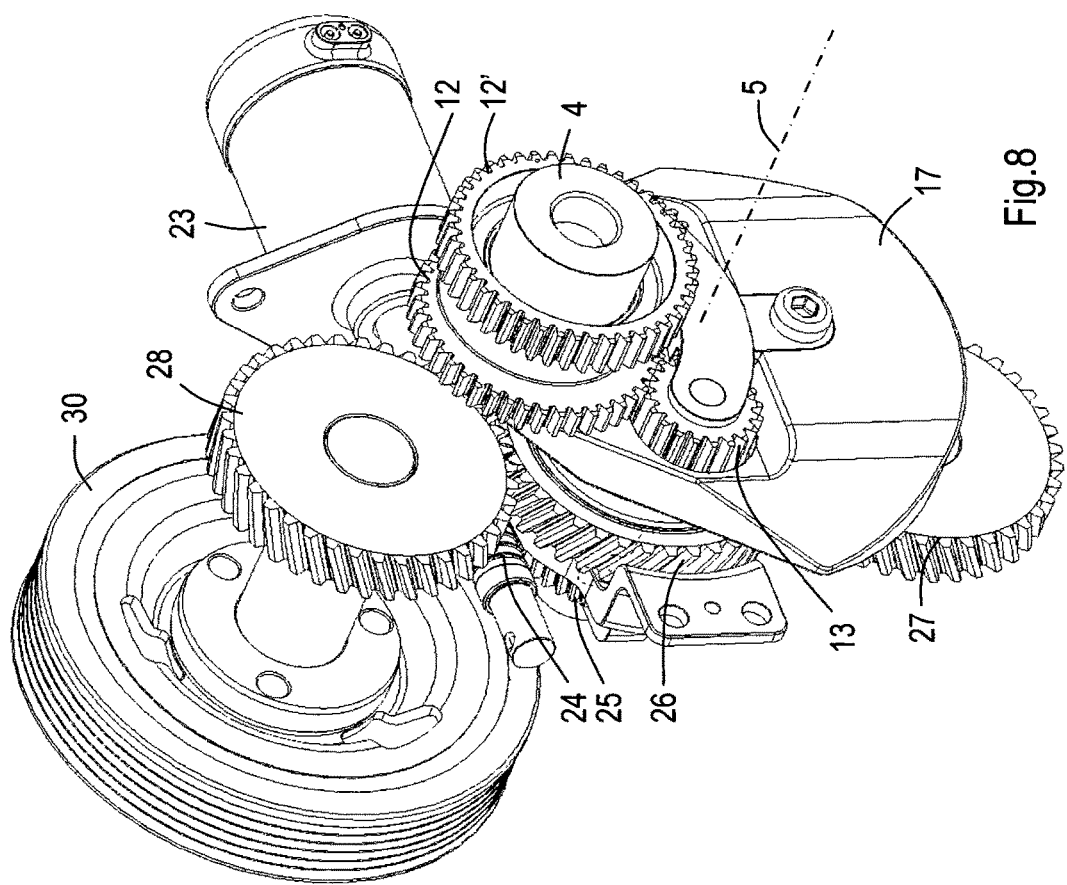
FIG. 8 is a comparable view as FIG. 7, but showing an alternative embodiment as seen from a different side.

FIGS. 7 and 8 show a drive means of the auxiliary gear 14 for adjusting the compression ratio of the mechanism 1 in a continuous manner instead of by mechanism of discrete steps as described in relation to the embodiment that is shown in FIGS. 3 and 5. The alternative drive means comprises an actuator 23 in the form of an electric motor, which is able to drive the auxiliary gear 14 via a worm 24 and worm gear 25 which is fixed to the auxiliary shaft 16, but other alternative drive mechanism are conceivable. Upon rotation of the worm 24 the top and bottom dead center of the piston 11 can be influenced. In the embodiment as shown in FIGS. 7 and 8 the torsion spring 18 could be omitted. However, the torsion spring 18 may be appropriate in order to balance the actual force of the worm gear 25 onto the worm 24, hence requiring relatively limited power to drive the worm 24. The actual force of the worm gear 25 onto the worm 24 may be caused by combustion forces in case of an internal combustion engine.

An advantage of applying a drive mechanism including the worm 24 is that it provides the opportunity to determine the actual rotational force of the auxiliary shaft 16 on the worm 24. In case of an internal combustion engine this force is directly related to combustion pressure on the piston 11. The force may be measured by a force or pressure sensor at the worm 24, for example a piezo electric element or the like. The sensor may be incorporated in the bearings of the worm 24. The signal may be used for misfire detection, for example.

It is noted that the auxiliary shaft 16 provides the opportunity to measure combustion forces in alternative manners, for example by means of measuring torque of the auxiliary shaft 16.

FIGS. 7 and 8 also show transfer members for driving auxiliary parts in case of an internal combustion engine. Both embodiments in FIGS. 7 and 8 have a power take-off gear 26 which is attached to the crankshaft 2. The power take-off gear 26 meshes with a first drive gear 27, for example for driving an oil pump, and a second drive gear 28, for example for driving a camshaft. The embodiment of FIG. 7 shows that the second drive gear 28 is mounted on a common axis with a sprocket wheel 29 for driving a chain. The embodiment of FIG. 8 shows that the second drive gear 28 is mounted on a common axis with a pulley 30 for driving a belt. In an alternative embodiment the pulley 30 or sprocket wheel 29 may be replaced by a wheel for driving a toothed belt. Since the pulley 30 and the sprocket 29 are located on a shaft that extends parallel to the crankshaft 2 the mechanism 1 can be built compact in the longitudinal direction of the crankshaft 2, despite the presence of parts of the drive means for turning the auxiliary gear 14 at the end of the crankshaft 2.

Figure 23:
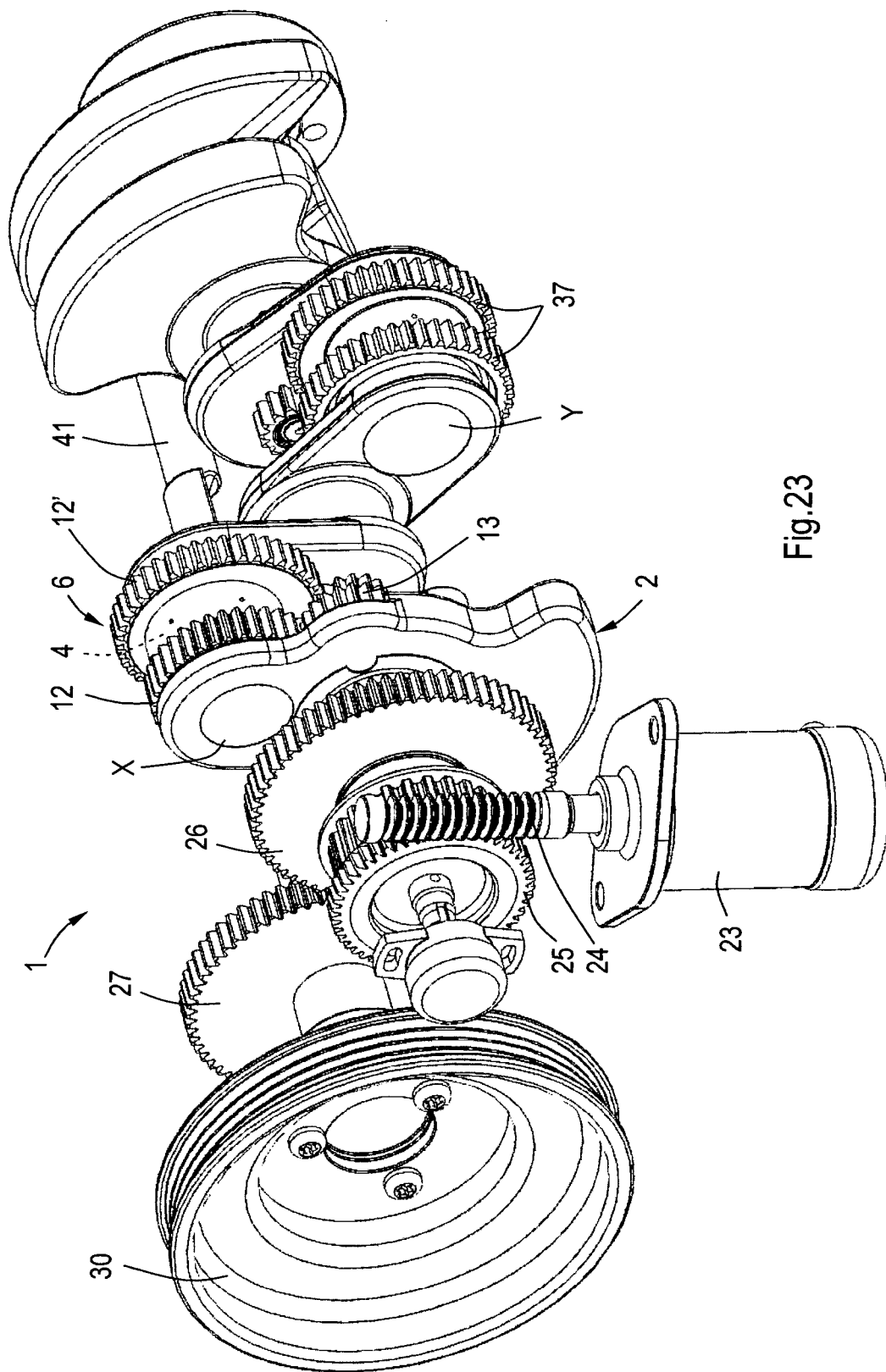
FIG. 23 is a perspective view of a three-cylinder internal combustion engine which is provided with an alternative embodiment of a reciprocating piston mechanism according to the invention.

Such a structure is also shown in the embodiment of the mechanism 1 of a three-cylinder internal combustion engine as depicted in FIG. 23. In this case the power take-off gear 26 meshes with the first drive gear 27 that is now mounted to a balance shaft 41, together with the pulley 30. It is noted that this structure is applicable to engines that have a different number of cylinders.

Figure 24:
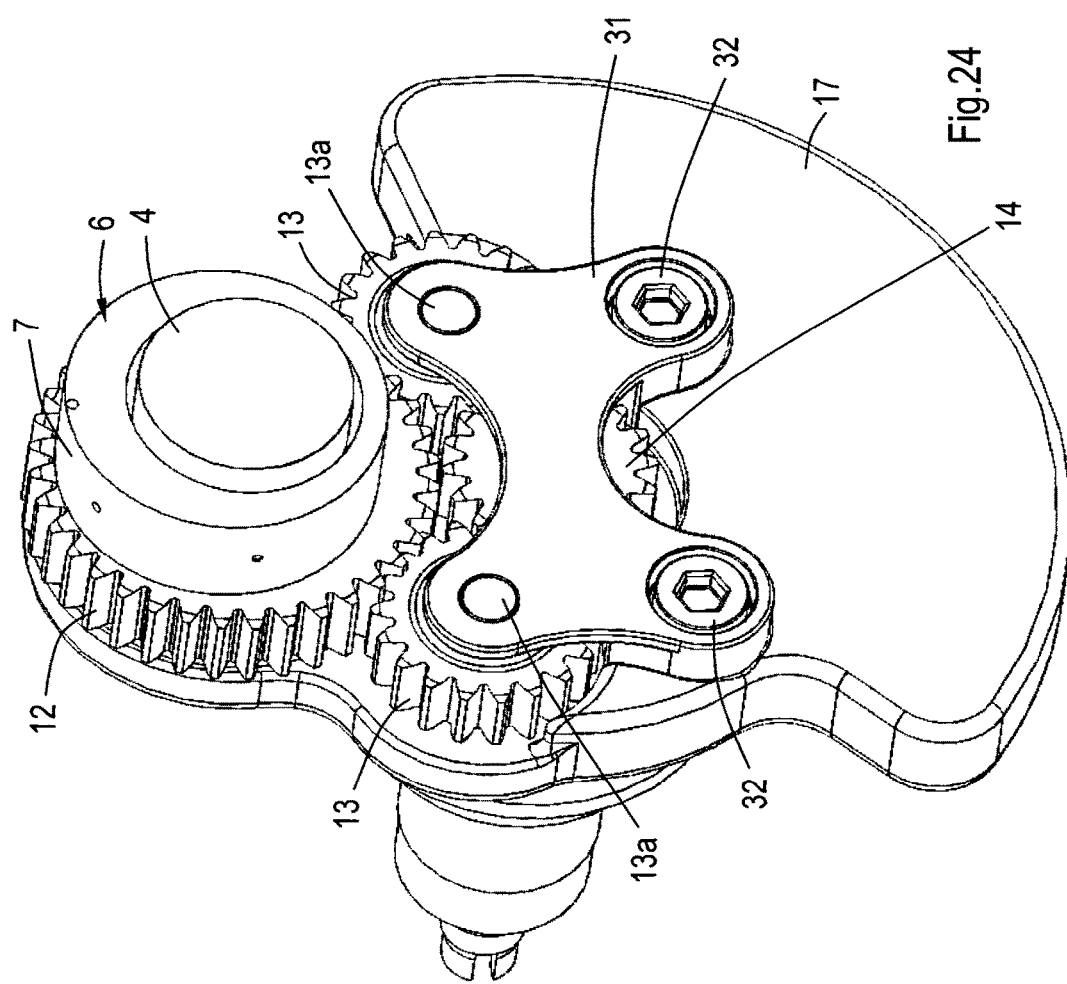
FIG. 24 is an enlarged view of a part of the embodiment as shown in FIG. 23.

In the embodiment as shown in FIG. 23 the diameter of the crank member gear 12 is smaller than that of the second crank member gear 12' and the further crank member gears 37. This provides the opportunity to arrange the gears 12-14 within a common plane, which is shown in FIG. 24. The width of the crank member gear 12, however, is greater than that of the second crank member gear 12' and the further crank member gears 37. Furthermore, the diameter of a portion of the crankpin 4 at the crank member gear 12 is smaller than at a portion of the crankpin 4 at the second crank member gear 12' and the diameter of the crankpin 4 at the further crank member gears 37. It is also conceivable that the diameter of the crankpin 4 at both the crank member gear 12 and the second crank member gear 12' is the same but smaller than that of the crankpin 4 at the further crank member gears 37. If the diameter of the bearing portion 7 of the crank member 6 is also relatively small the big end of its cooperating connecting rod may also be smaller than that of the other connecting rods.

Due to the relatively small diameter of the crankpin 4 at the crank member gear 12, the connection between the crankpin 4 and the crank arm 17 can be relatively less strong, which might cause a problem since the connection is intended to be a press fit. However, in practice this is not a problem for the following reasons.

The crankshaft 2 as shown in FIG. 23 is made by three press fits; two of them can be seen in FIG. 23 and are indicated by X and Y, respectively, where the respective crank pins 4 are pressed into respective holes of the corresponding crank arms 17. The portion of the crankshaft 2 between the press fits X and Y can be made of one piece. FIG. 23 shows that the diameter of the crankpin 4 at the press fit X has a smaller diameter than the crankpin 4 at the press fit Y. In practice, the force that is guided through the crankshaft 2 at the press fit X is smaller than at the press fit Y since a load take-off, or flywheel, of the internal combustion engine is located at the end of the crankshaft 2 opposite to the pulley 30. The press fit X guides the force to the balance shaft 41 and to the pulley 30, optionally including auxiliary devices. Therefore, it is allowable that the crankpin 4 at the crank member 6 has a smaller diameter than the other crankpins 4.

Figure 9:
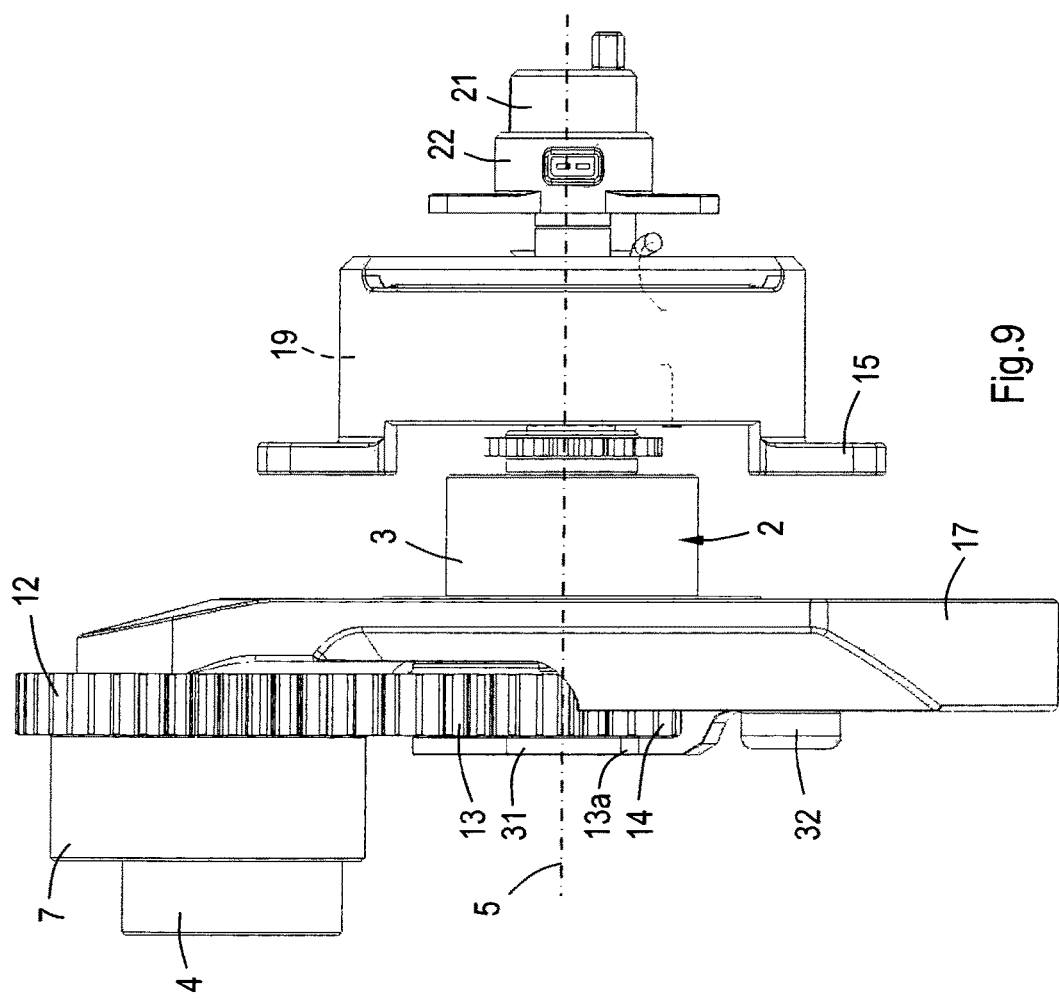
FIG. 9 is a side view of the embodiment as shown in FIGS. 4 and 5.

FIG. 9 shows a side view of the embodiment as shown in FIGS. 4 and 5. It can be seen that the gears 12-14 are partly located in a recess of the crank arm 17. This provides the opportunity to minimize the length of the mechanism 1 as seen along the crankshaft 2.

Figure 10:
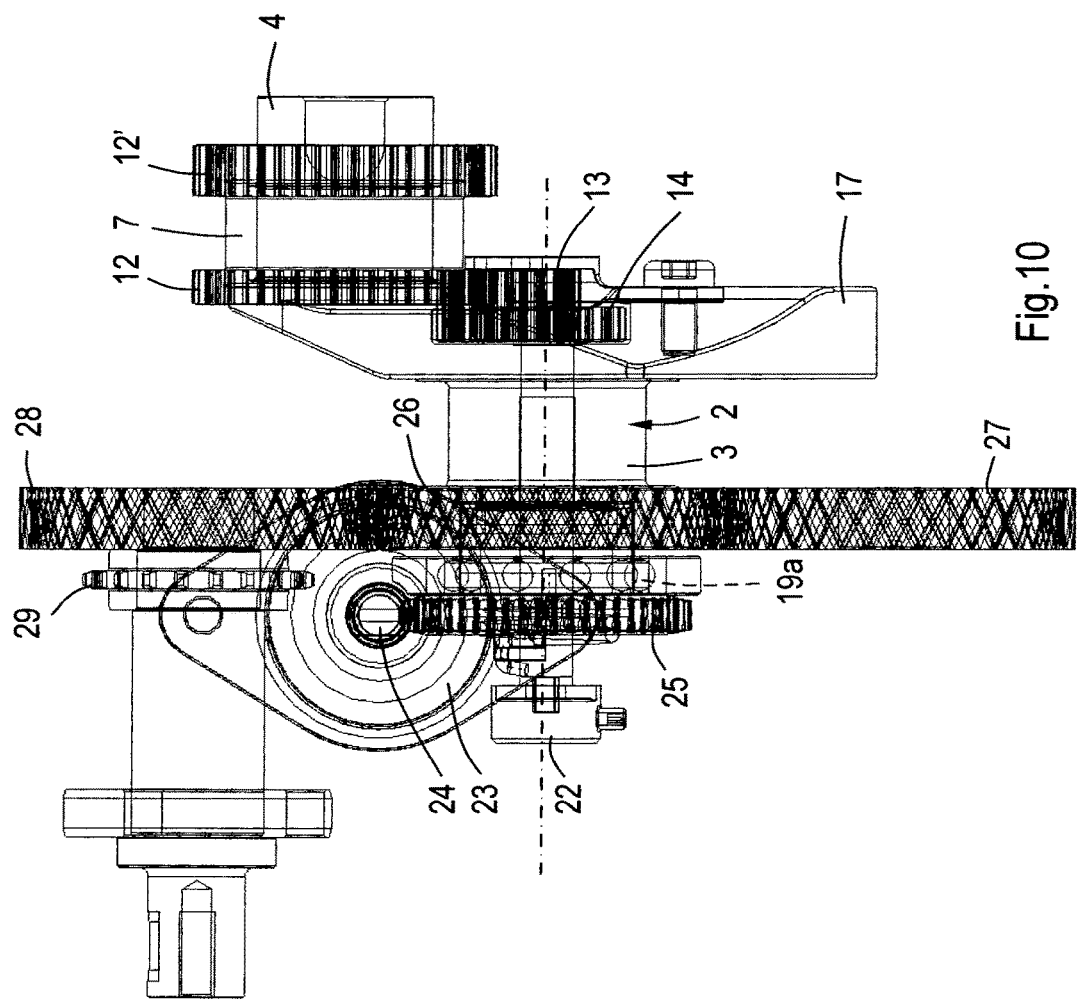
FIG. 10 is a side view of the embodiment as shown in FIG. 7.

FIG. 10 shows a side view of the embodiment as shown in FIG. 7. It can be seen that in this embodiment the gears 12-14 are not located within a common plane as explained in relation to the embodiments of FIGS. 6 and 24. The auxiliary gear 14 partly overlaps the crank member gear 12 as seen in a direction along their center lines.

Referring to the embodiment as shown in FIG. 4 it can be seen that the intermediate gears 13 are rotatably mounted to the crank arm 17 of the crankshaft 2. In this case the intermediate gears 13 are rotatable to respective intermediate shafts 13a via plain bearings, needle bearings or the like (not shown), which intermediate shafts 13a are pressed in a bracket 31. The intermediate shafts 13a fit in respective holes in the crank arm 17 and are fixed to the crankshaft 2. Upon assembly of the mechanism 1 the intermediate shafts 13a are pressed into the crankshaft 2, then the intermediate gears 13 are mounted onto the intermediate shafts 13a, after which the bracket 31 is pressed onto the intermediate shafts 13a and fixed to the crank arm 17 through a bolt 32. The bracket 31 also prevents displacement of the auxiliary gear 14 in a direction away from the crank arm 17. In the embodiment as shown in FIG. 24 it can be seen that the bracket 31 has a different shape. It is fixed to the crank arm 17 through two bolts 32.

Figure 11:
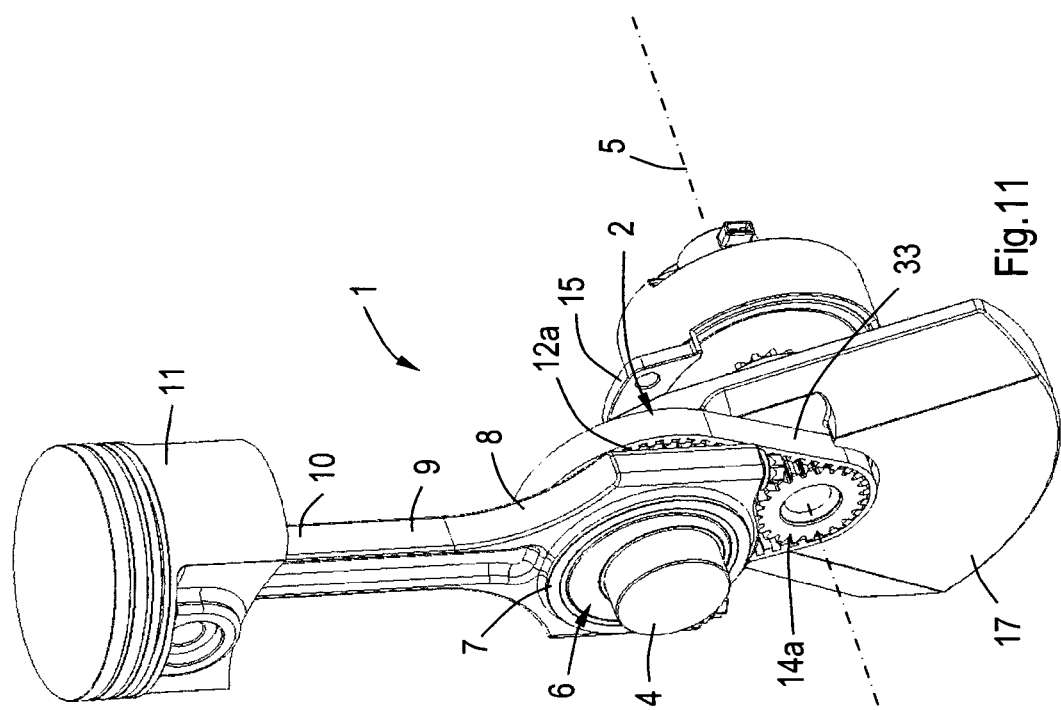
FIG. 11 is a similar view as FIG. 1, but showing an alternative embodiment.
Figure 12:
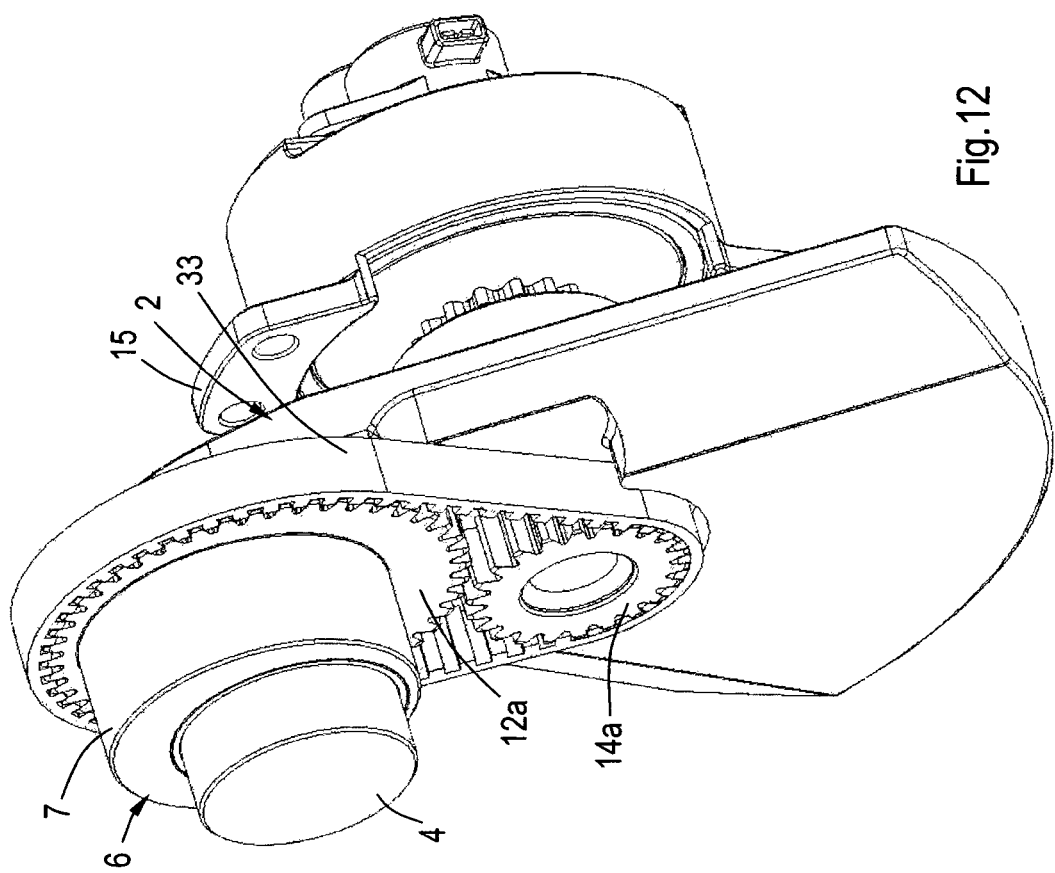
FIG. 12 is a perspective view of a part of the embodiment of FIG. 11 on a larger scale.
Figure 13:
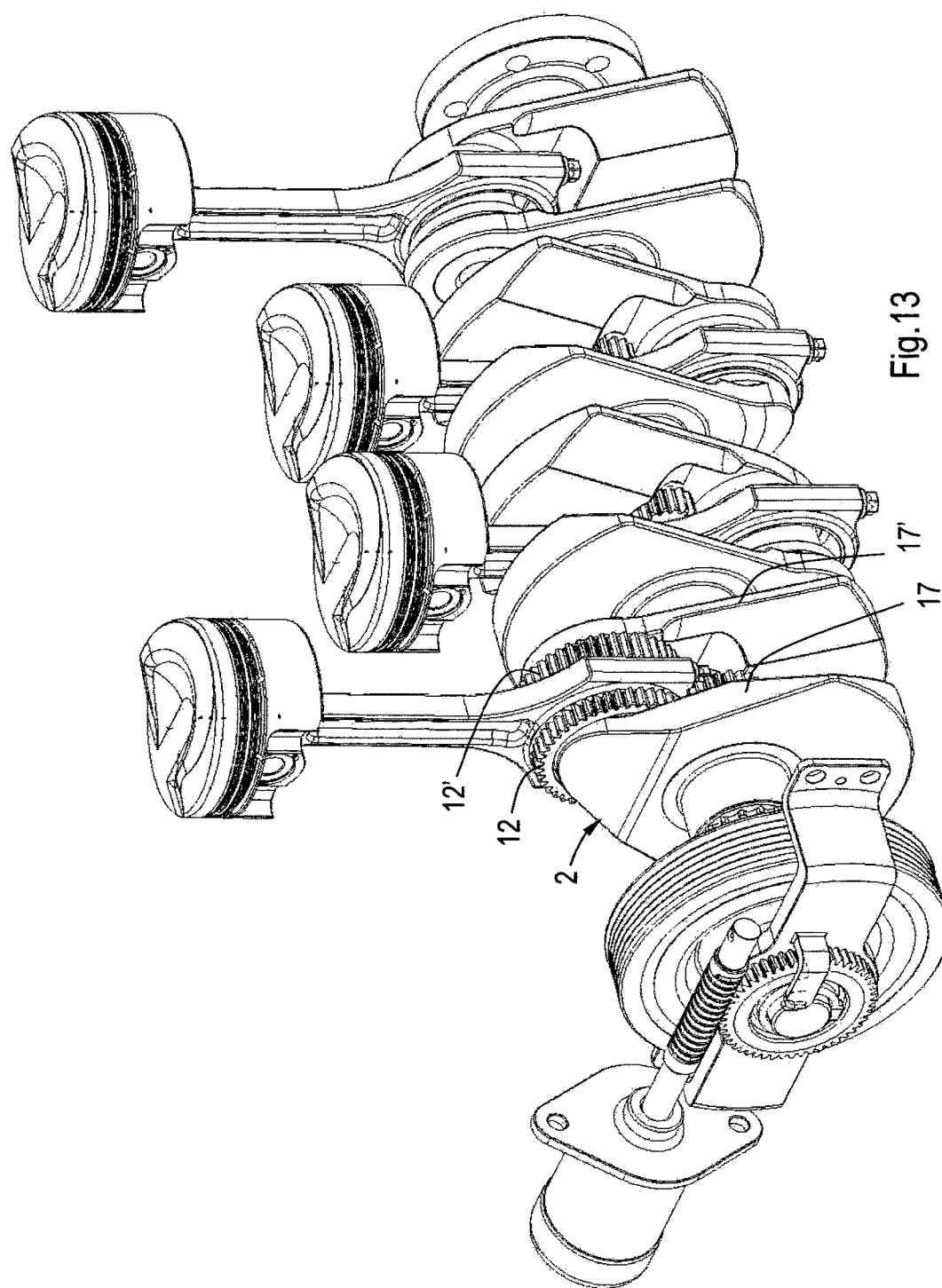
FIG. 13 is a perspective view of a multi-cylinder internal combustion engine which is provided with an embodiment of a reciprocating piston mechanism according to the invention.
Figure 14:
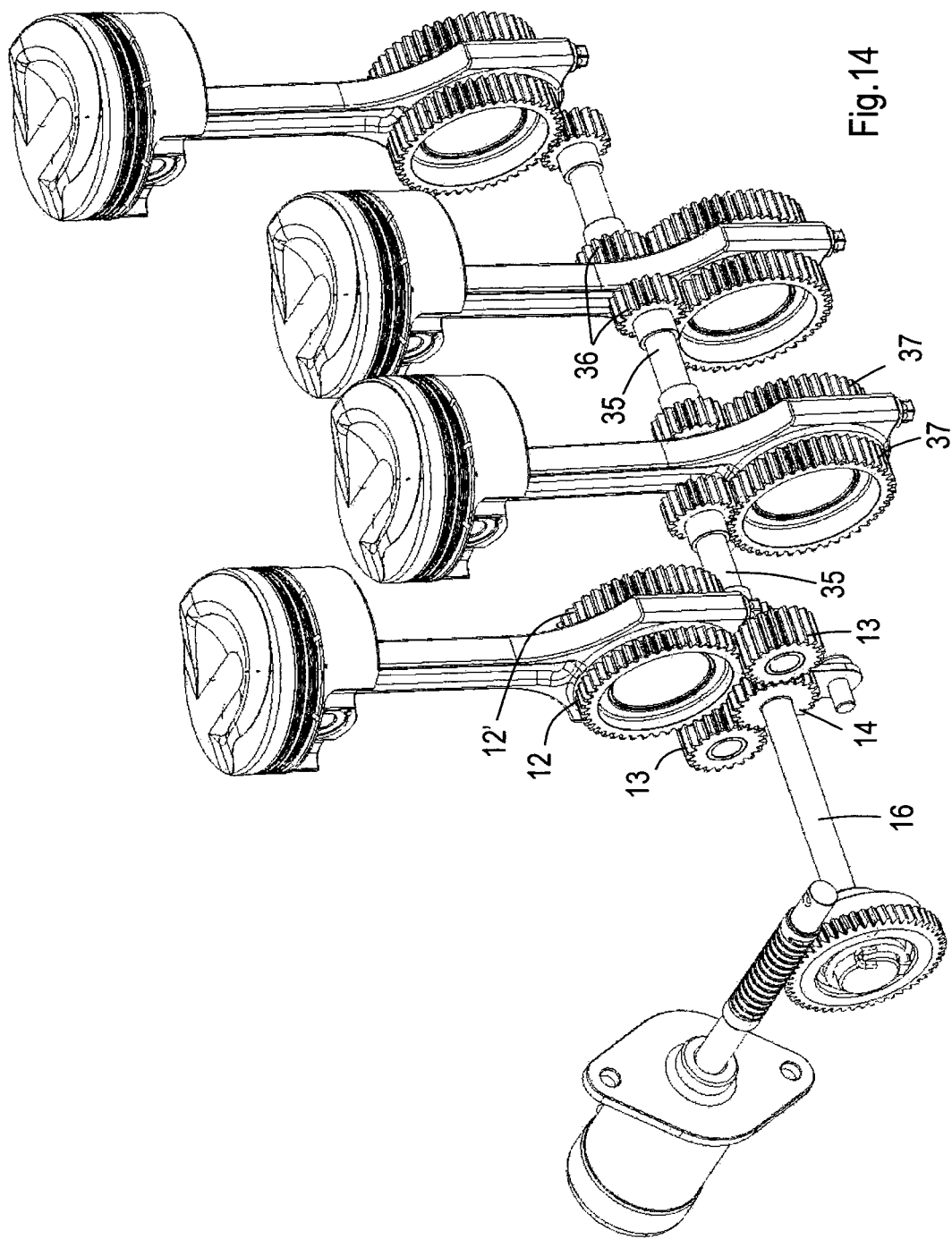
FIG. 14 is a similar view as FIG. 13, but without showing the crankshaft.
Figure 27:
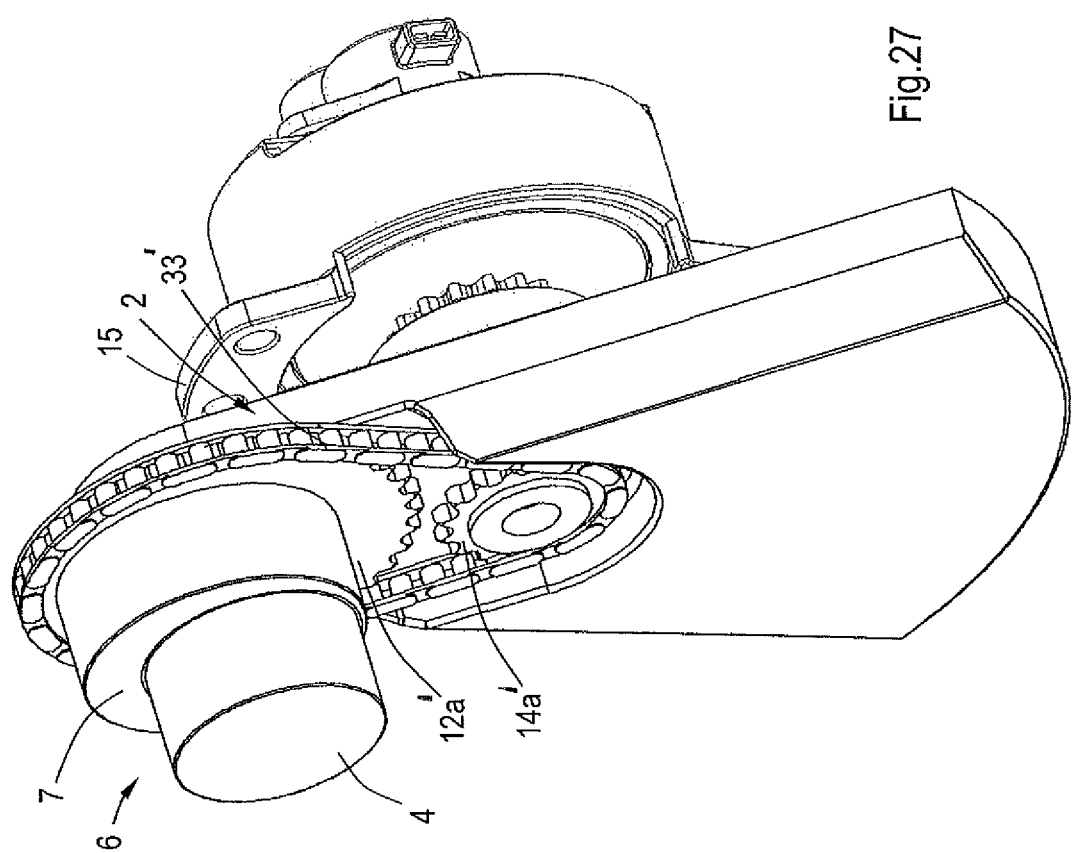
FIG. 27 is a similar view as FIG. 12, but illustrating sprockets and a chain.

FIGS. 11 and 12 show an alternative embodiment of the mechanism 1. Parts that are similar to those in the embodiments as described hereinbefore are indicated by corresponding reference signs. In this case the crank member gear 12 and the auxiliary gear 14 are replaced by respective wheels 12a and 14a for driving a toothed belt 33. This transmission may also be an alternative belt or a combination of sprocket wheels and a chain, shown as sprockets 12a' and 12b' and chain 33' in FIG. 27.

Figure 21:
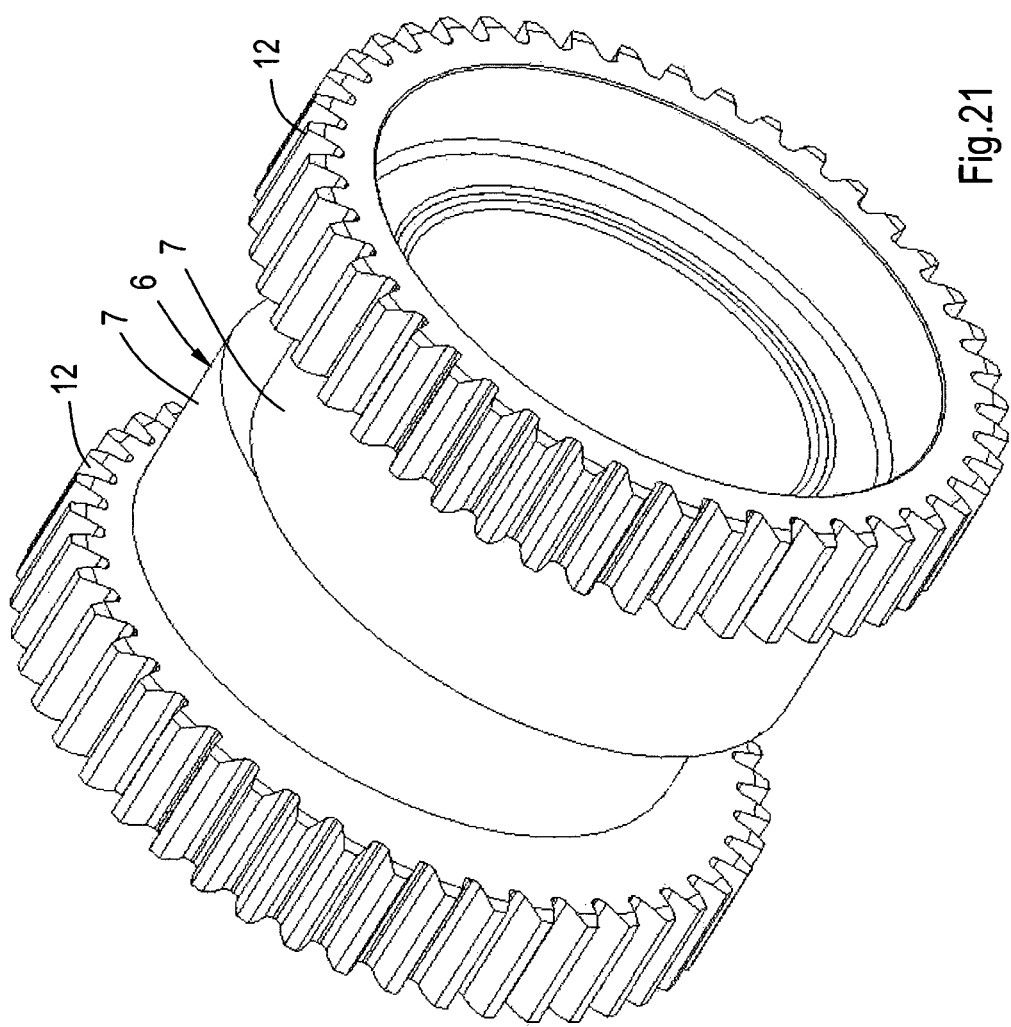
FIG. 21 is a perspective view of an alternative embodiment of a crank member, which is suitable for a reciprocating piston mechanism in V arrangement.

FIG. 21 shows an alternative crank member 6 which is suitable for a reciprocating piston mechanism having a V arrangement, for example a V-engine. The crank member 6 comprises two crank member gears 12. Furthermore, the crank member 6 is provided with two bearing portions 7, which are angled with respect to each other about the centerline of the crank member 6. Due to this configuration the corresponding pistons reach their respective top dead centers at different angles of the crankshaft.

Figure 15:
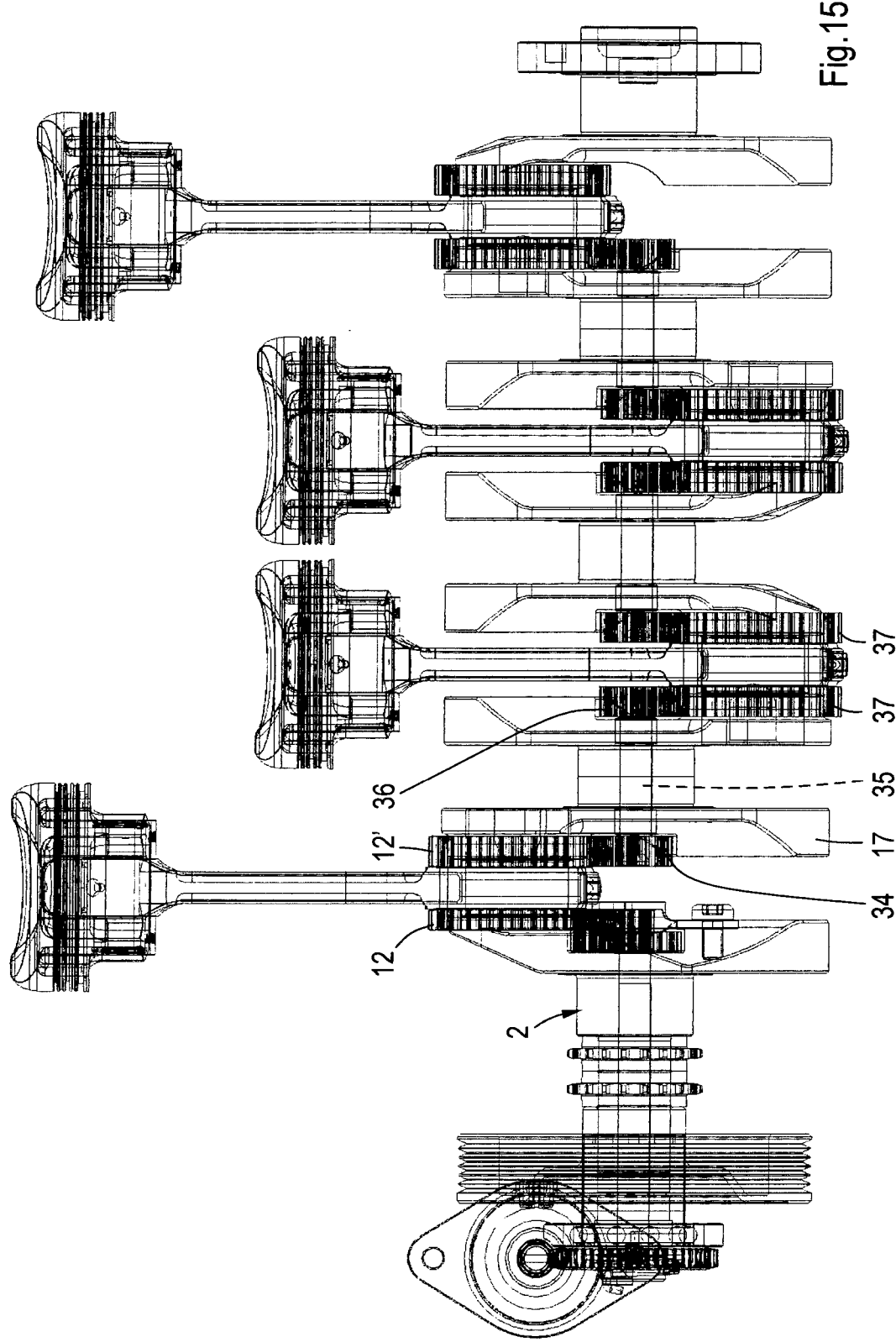
FIG. 15 is a side view of the embodiment as shown in FIG. 14.
Figure 16:
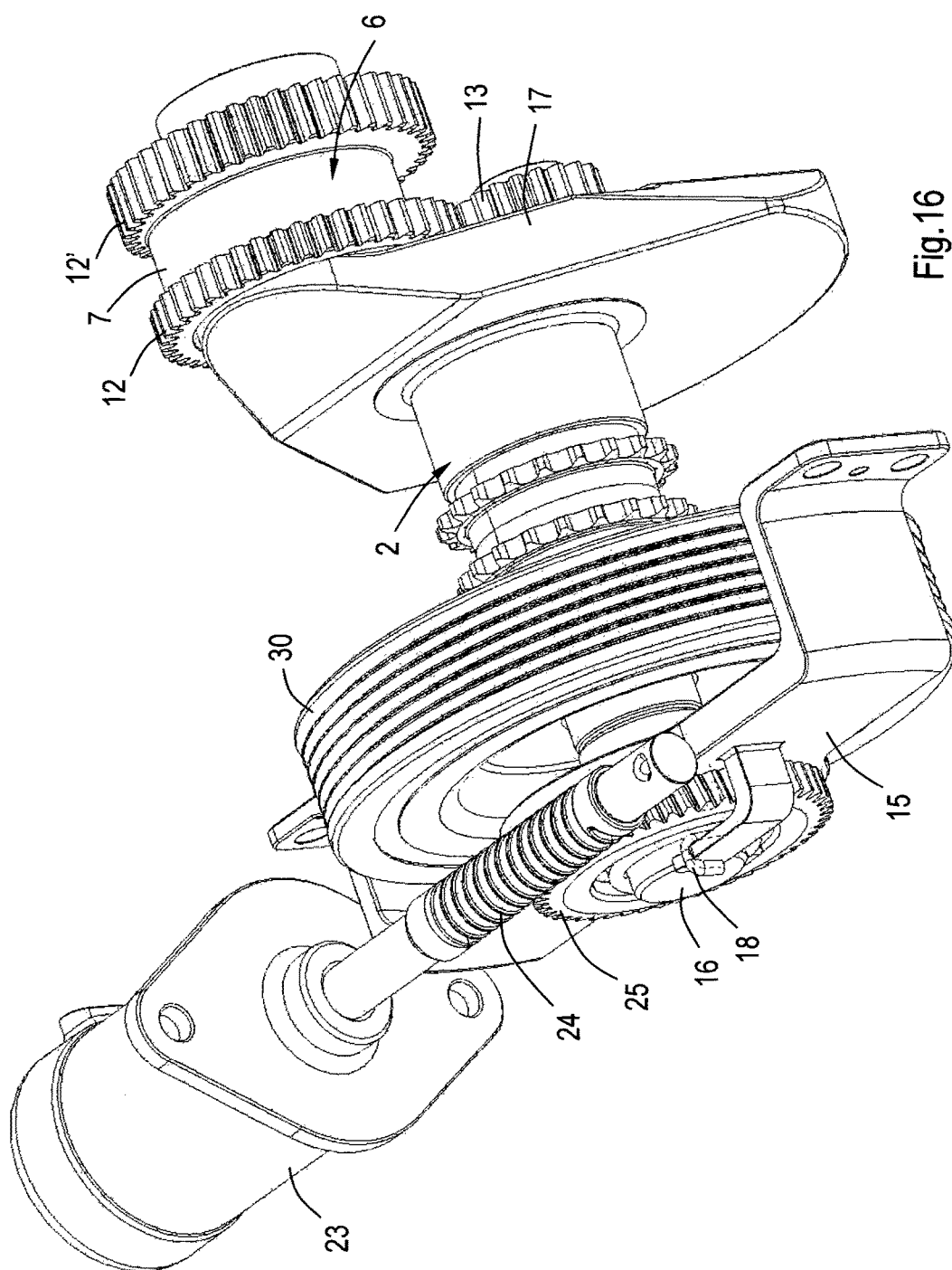
FIG. 16 is a perspective view of a part of the embodiment as shown in FIG. 13.
Figure 25:
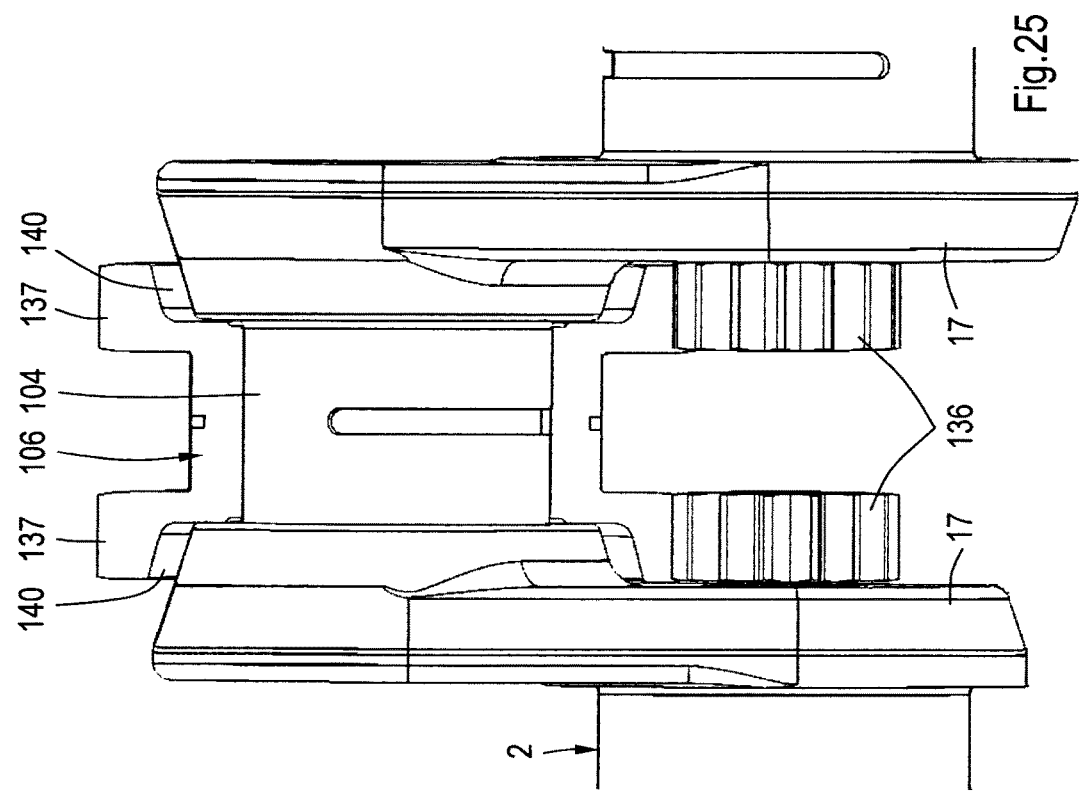
FIG. 25 is a side view and a partial sectional view of a part of an alternative embodiment as shown in FIG. 15 on a larger scale.

FIG. 25 shows a part of the crankshaft of a multi-cylinder engine which is comparable to the embodiment as shown in FIG. 15. Two other auxiliary gears 136 mesh with respective further crank member gears 137 of the corresponding crank member 106 that is rotatably mounted to the corresponding crank pin 104. In order to keep the crankshaft 2 as strong as possible and to build in a compact way, the internal diameter of the crank member 106 is enlarged at an end portion thereof. This means that the further crank member gears 137 partly protrude beyond the cylindrical portion of the crankpin 104 in longitudinal direction thereof which contacts the big end of the cooperating connecting rod. In fact, the crank member 106 is provided with central cavities 140 at end portions thereof for receiving transition portions of the crankshaft 2 that are located between the respective crank arms 17 and the cylindrical portion of the crankpin 104, which transition portions have a larger diameter than the cylindrical portion of the crankpin 104.

It is noted that in the embodiments as described hereinbefore the internal diameter of the crank member 4 may be enlarged at an end portion thereof, such that an outer circumferential portion of the crank member gear 12 at least partly protrudes beyond the cylindrical portion of the crankpin 4 in longitudinal direction thereof.

Figure 26:
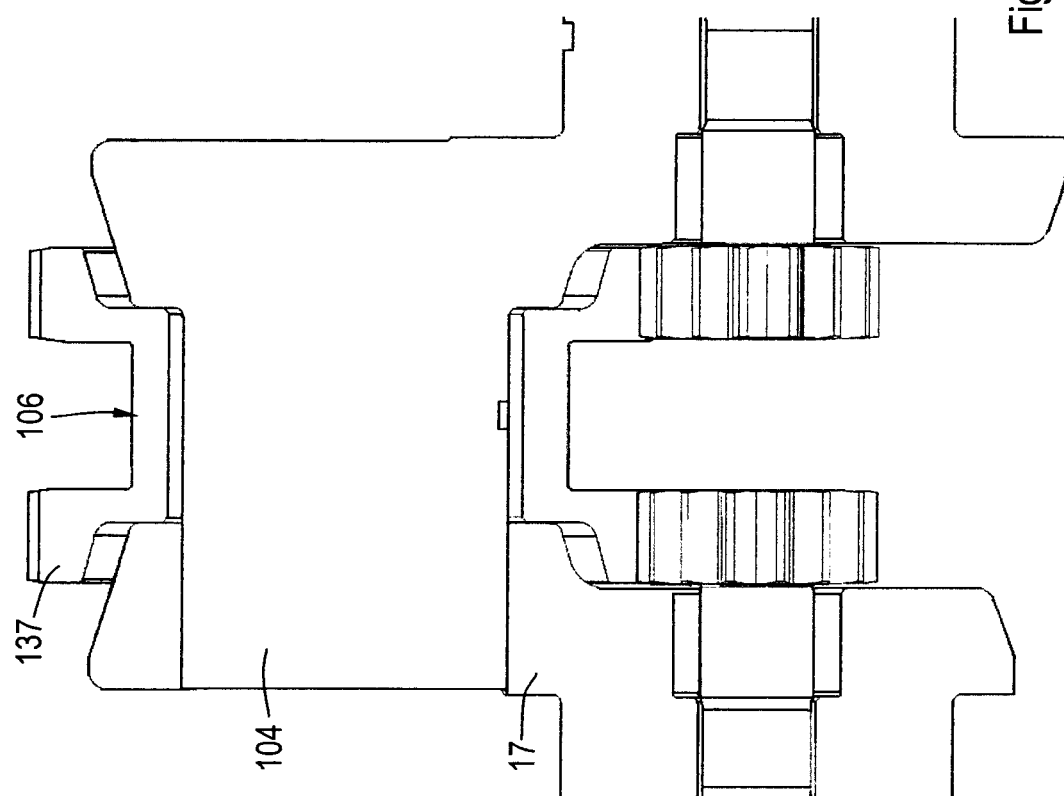
FIG. 26 is a similar view as FIG. 25, but illustrating the press fit connection between the crankpin and the cooperating crank arm.

An axially protruding crank member gear 12, 137 is also advantageous to maximize the length of the press fit connection between the adjacent crank arm 17 and the crankpin 4, 104, which is illustrated in FIG. 26 at the left side of the crankpin 104. In general, the length of the press fit in axial direction of the crankpin is preferably larger than 40% of the diameter of the cooperating crankpin.

It is noted that different features of the embodiments as described hereinbefore may be combined.

From the foregoing, it will be clear that the invention provides a relatively simple reciprocating piston mechanism which provides the possibility of designing a compact embodiment of the mechanism.

The invention is not limited to the embodiments shown in the drawings and described hereinbefore, which may be varied in different manners within the scope of the claims and their technical equivalents. For example, the reciprocating piston mechanism may be extended to larger mechanisms having more pistons than the embodiments as described hereinbefore. In an alternative embodiment the crank member may be cylindrical instead of eccentrical, which appears to result in lower friction losses than in a conventional mechanism having no crank member and gear transmission for driving the crank member.

The invention claimed is:

1. A reciprocating piston mechanism comprising
a crankcase;
a crankshaft having at least a crankpin, said crankshaft being supported by the crankcase and rotatable with respect thereto about a crankshaft axis;
at least a connecting rod including a big end and a small end;
a piston being rotatably connected to the small end;
a crank member being rotatably mounted on the crankpin, and comprising at least a bearing portion having an outer circumferential wall which bears the big end of the connecting rod such that the connecting rod is rotatably mounted on the bearing portion of the crank member via the big end;
wherein the crank member is driveably coupled to an auxiliary wheel which is fixed to an auxiliary shaft that extends concentrically through the crankshaft, wherein the crankshaft and the auxiliary shaft are rotatable with respect to each other, wherein the auxiliary wheel is disposed at a same side of an adjacent crank arm as the crank member, wherein the reciprocating piston mechanism is configured such that under operating conditions the crank member rotates about the crankpin in an opposite direction as the crankshaft and at half speed thereof, whereas the auxiliary shaft has a substantially fixed angular position with respect to the crankcase.

2. The reciprocating piston mechanism according to claim 1, wherein the crank member comprises a crank member wheel which is driveably coupled to the auxiliary wheel by a toothed belt.

3. The reciprocating piston mechanism according to claim 1, wherein the crank member comprises a crank member sprocket and the auxiliary wheel is formed by an auxiliary sprocket, wherein the crank member sprocket is drivable by a chain.

4. The reciprocating piston mechanism according to claim 1, wherein the crank member is provided with a crank member gear, and the auxiliary wheel is formed by an auxiliary gear being an external gear, wherein the crank member gear and the auxiliary gear are driveably coupled to each other by at least an intermediate gear, being an external gear, which meshes with the auxiliary gear and the crank member gear.

5. A reciprocating piston mechanism comprising
a crankcase;
a crankshaft having at least a crankpin, said crankshaft being supported by the crankcase and rotatable with respect thereto about a crankshaft axis;
at least a connecting rod including a big end and a small end;
a piston being rotatably connected to the small end;
a crank member being rotatably mounted on the crankpin, and comprising at least a bearing portion having an outer circumferential wall which bears the big end of the connecting rod such that the connecting rod is rotatably mounted on the bearing portion of the crank member via the big end;
wherein the crank member is driveably coupled to an auxiliary wheel which is fixed to an auxiliary shaft that extends concentrically through the crankshaft, wherein the crankshaft and the auxiliary shaft are rotatable with respect to each other, wherein the auxiliary wheel is disposed at a same side of an adjacent crank arm as the crank member, wherein the reciprocating piston mechanism is configured such that under operating conditions the crank member rotates about a centerline of the crankpin in an opposite direction as the crankshaft and at half speed thereof, whereas the auxiliary shaft has a substantially fixed angular position with respect to the crankcase.

* * * * *